United States Patent
Guo et al.

(10) Patent No.: US 10,498,816 B2
(45) Date of Patent: Dec. 3, 2019

(54) CONTENT DISTRIBUTION METHOD, SYSTEM AND COMPUTER-READABLE MEDIUM

(71) Applicant: FUJITSU LIMITED, Kawasaki-shi, Kanagawa (JP)

(72) Inventors: Zhaogong Guo, Koto (JP); Akira Itasaki, Yokohama (JP); Tatsuro Matsumoto, Yokohama (JP); Hiroyasu Sugano, Koto (JP)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 14/830,125

(22) Filed: Aug. 19, 2015

(65) Prior Publication Data
US 2016/0057225 A1    Feb. 25, 2016

(30) Foreign Application Priority Data

Aug. 22, 2014   (JP) ................. 2014-169876

(51) Int. Cl.
*G06F 15/16*  (2006.01)
*H04L 29/08*  (2006.01)
(Continued)

(52) U.S. Cl.
CPC .......... *H04L 67/1097* (2013.01); *H04L 67/10* (2013.01); *H04L 67/18* (2013.01); *H04L 67/42* (2013.01); *H04W 4/027* (2013.01)

(58) Field of Classification Search
CPC ...... H04L 67/1097; H04L 67/10; H04L 67/18
(Continued)

(56) References Cited

U.S. PATENT DOCUMENTS 8,073,460 B1 * 12/2011 Scofield .................. H04W 4/21
455/456.1
8,996,035 B2 * 3/2015 Busch .................. H04W 4/029
455/456.3
(Continued)

FOREIGN PATENT DOCUMENTS

JP    2004070419 A    3/2004
JP    2007-300566 A    11/2007
(Continued)

OTHER PUBLICATIONS

Notification of Reasons for Refusal issued in corresponding Japanese Application No. 2014-169876 dated Feb. 13, 2018 (with English translation), 10 pages.
(Continued)

*Primary Examiner* — Atta Khan
(74) *Attorney, Agent, or Firm* — Xsensus LLP

(57) ABSTRACT

A system includes: a storage unit configured to store a plurality of pieces of content and a plurality of distribution conditions corresponding to each of the plurality of pieces of content; and circuitry configured to acquire, from a mobile terminal, condition information indicating a condition of the mobile terminal; compare the condition information acquired from the mobile terminal to each of the plurality of distribution conditions stored in the storage unit; identify one or more pieces of content of the plurality of pieces of content having a distribution condition matching the condition information acquired from the mobile terminal based on the comparing; and distribute the identified one or more pieces of content to the mobile terminal.

15 Claims, 24 Drawing Sheets

(51) Int. Cl.
   *H04W 4/02* (2018.01)
   *H04L 29/06* (2006.01)
(58) Field of Classification Search
   USPC .......................................................... 709/219
   See application file for complete search history.

(56) References Cited

U.S. PATENT DOCUMENTS

| | | | |
|---|---|---|---|
| 2008/0201226 A1* | 8/2008 | Carlson | G06O 20/387 |
| | | | 705/14.26 |
| 2009/0076912 A1* | 3/2009 | Rajan | G06Q 30/02 |
| | | | 705/14.64 |
| 2009/0222342 A1* | 9/2009 | Greene | G06Q 30/02 |
| | | | 705/14.53 |
| 2010/0125490 A1* | 5/2010 | Kiciman | G06Q 30/02 |
| | | | 705/14.1 |
| 2011/0055005 A1* | 3/2011 | Lang | G06Q 30/02 |
| | | | 705/14.45 |
| 2011/0238476 A1* | 9/2011 | Carr | G06Q 30/00 |
| | | | 705/14.25 |
| 2013/0006738 A1* | 1/2013 | Horvitz | G06Q 30/0207 |
| | | | 705/14.16 |
| 2013/0204690 A1* | 8/2013 | Liebmann | G06Q 30/0225 |
| | | | 705/14.26 |

FOREIGN PATENT DOCUMENTS

| | | |
|---|---|---|
| JP | 2010-113402 | 5/2010 |
| JP | 2011-238262 A | 11/2011 |
| JP | 2013-024652 A | 2/2013 |
| JP | 2013-83596 A | 5/2013 |
| JP | 2013-114432 A | 6/2013 |

OTHER PUBLICATIONS

Office Action dated Sep. 18, 2018 in corresponding Japanese Patent Application No. 2014-169876 (with English Translation), 9 pages.
Decision of Dismissal of Amendment dated Apr. 23, 2019, issued in corresponding Japanese Patent Application No. 2014-169876, 6 pages (with English Translation).

* cited by examiner

FIG. 3

```
DISTRIBUTION CONDITION
CONTENT ID···0003
SHOP ID···Shop#1
DOWNLOAD PERMISSION SERVER···Sv#1
DISTRIBUTION DESIRED TYPE···
    APPAREL
CONTENT CREATION DATE···DECEMBER 24, 2013
CONTENT VALIDITY PERIOD···JUNE 1, 2014 TO JUNE 30, 2014
CONTENT UPDATE TARGET···0002
CURRENT CONTENT GENERATION···FIRST GENERATION
RE-DISTRIBUTABLE GENERATION···SECOND GENERATION
RE-DISTRIBUTABLE TIME NUMBER···ONCE
DELETION CONDITION···VALIDITY PERIOD RUN OUT, GENERATION RUN OUT, TIME NUMBER RUN OUT
             NO COPY DESTINATION FOR FIXED TIME PERIOD
```

FIG. 4

```
SERVER INFORMATION
SERVER ID···Sv#1
SHOP ID···Shop#1
SHOP TYPE···APPAREL
RETENTION CONTENT ID LIST···0003、0001
POSITION INFORMATION···LONG. 139.765···E, LAT. 35.6723···N
USER VISIT HISTORY···
·Sv#2→Sv#1
·Sv#2→Sv#3→Sv#1
·Sv#3→Sv#2→Sv#1
```

FIG. 6

```
CLIENT INFORMATION
RETENTION CONTENT ID LIST···0003、0001
USER VISIT PATH···Sv#2→Sv#1
```

CONTENT DISTRIBUTION METHOD, SYSTEM AND COMPUTER-READABLE MEDIUM

CROSS-REFERENCE TO RELATED APPLICATION

This application is based upon and claims the benefit of priority of the prior Japanese Patent Application No. 2014-169876 filed on Aug. 22, 2014, the entire contents of which are incorporated herein by reference.

FIELD

The embodiments discussed herein are related to a content distribution method, a system and a computer-readable medium.

BACKGROUND

Conventionally, various technologies for distributing contents to a terminal apparatus have been proposed. For example, a technology is available wherein a content is distributed from a server or servers placed at one location or a small number of locations on a network and having original contents to a plurality of cache servers through the network and each of the cache servers distributes the content to a user terminal within a communication coverage range of the cache server. As a related prior art document, Japanese Laid-open Patent Publication No. 2010-113402 is available.

However, since, in the conventional technology, a content is distributed to the cache servers and each cache server distributes the content to a user terminal within a communication coverage range of the cache server, it is difficult to control the distribution range of the content.

SUMMARY

According to an aspect of the embodiments, A system includes: a storage unit configured to store a plurality of pieces of content and a plurality of distribution conditions corresponding to each of the plurality of pieces of content; and circuitry configured to acquire, from a mobile terminal, condition information indicating a condition of the mobile terminal; compare the condition information acquired from the mobile terminal to each of the plurality of distribution conditions stored in the storage unit; identify one or more pieces of content of the plurality of pieces of content having a distribution condition matching the condition information acquired from the mobile terminal based on the comparing; and distribute the identified one or more pieces of content to the mobile terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 depicts an example of a data configuration of distribution condition data;

FIG. 4 depicts an example of a data configuration of server information;

FIG. 6 depicts an example of a data configuration of client information;

DESCRIPTION OF EMBODIMENTS

According to one aspect of embodiments disclosed herein, the distribution range of a content can be controlled. In the following, the embodiments of a content distribution apparatus, a content distribution system and a content distribution method disclosed herein are described in detail on the basis of the drawings. It is to be noted that the present technology is not limited by the embodiments. Further, the embodiments can be suitably combined within a range within which the processing contents are not contradictory with each other.

First Embodiment

[Configuration of System]

Figure 1:
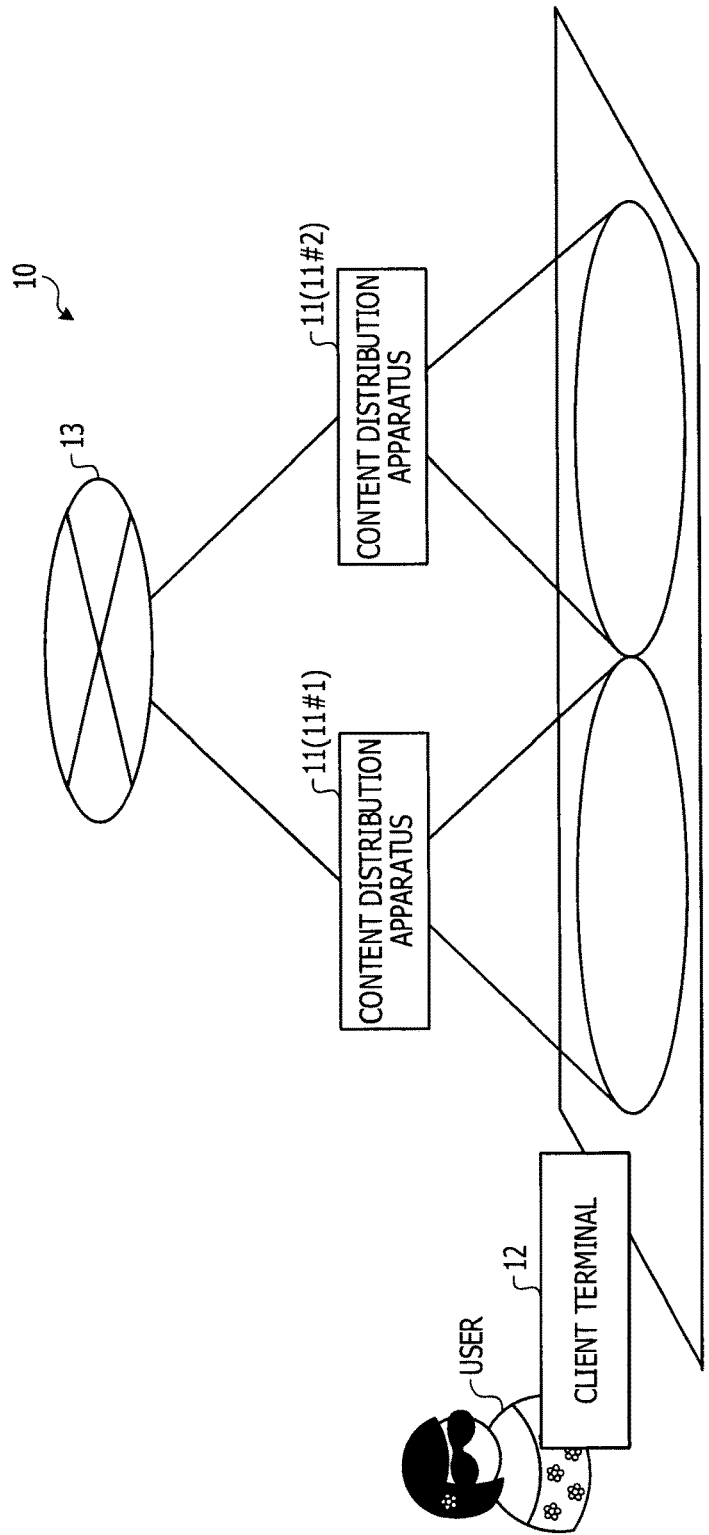
FIG. 1 depicts an example of a general configuration of an entire content distribution system according to a first embodiment.

First, a configuration of a content distribution system is described. FIG. 1 depicts an example of a general configuration of an entire content distribution system according to a first embodiment. As depicted in FIG. 1, a content distribution system 10 according to the first embodiment includes a plurality of content distribution apparatuses 11 and a client terminal 12. The plurality of content distribution apparatuses 11 are coupled for communication with each other through a network 13 and can exchange various kinds of information therebetween. As one form of the network 13, an arbitrary kind of a communication network such as a mobile communication network for a portable telephone set or the like, the Internet, a local area network (LAN) or a virtual private network (VPN) can be adopted regardless of wired communication or wireless communication. It is to be noted that, while two content distribution apparatuses 11 (11#1 and 11#2) are depicted in the example of FIG. 1, the number of content distribution apparatuses 11 can be set to an arbitrary number. Further, while a case in which one client terminal 12 is involved is depicted in the example of FIG. 1, the present technology is not limited to this and the number of client terminals 12 can be set to an arbitrary number.

The content distribution apparatus 11 is a physical server that provides a service of distributing a content and is, for example, a server computer. In the present embodiment, a case in which distribution of a coupon is performed as a content is described as an example. The content distribution apparatus 11 is disposed within a target area for which distribution of a content is to be performed. For example, the content distribution apparatus 11 is disposed in a shop which performs distribution of a coupon. It is to be noted that the number of content distribution apparatuses 11 to be disposed in the target area is not limited to one but a plurality of content distribution apparatuses 11 may be disposed. For example, a plurality of content distribution apparatuses 11 may be disposed such that a service can be enjoyed anywhere in the inside of a shop taking a reaching distance of wireless communication into consideration.

A content to be distributed is uploaded to the content distribution apparatus 11. In the content distribution system 10 according to the first embodiment, the content distribution apparatuses 11 perform communication with each other by peer to peer (P2P) communication, and transmit and receive mutually lacking contents to and from each other to share the contents. For example, in the content distribution system 10, if a content is uploaded to one of the content distribution apparatuses 11, then the uploaded content is transmitted to the other content distribution apparatuses 11 so as to be stored into the content distribution apparatuses 11.

Around each content distribution apparatus 11, a communication area within which distribution of a content is possible is formed. In the example of FIG. 1, the communication area of each content distribution apparatus 11 is indicated by an ellipse. Each content distribution apparatus 11 acquires client information relating to a client terminal 12 within the communication area from the client terminal 12. The content distribution apparatus 11 selects a content of a distribution target on the basis of the acquired client information and distributes the selected content to the client terminal 12.

The client terminal 12 is a terminal apparatus the user has. The client terminal 12 is, for example, a portable terminal apparatus such as a tablet terminal, a smartphone or a personal digital assistant (PDA). In the client terminal 12, a program for performing displaying of a content to be distributed operates. For example, an application program for performing various processes relating to a content such as downloading of a content from a server, displaying of a content, and storage of a content is installed into the client terminal 12 and the application program operates. It is to be noted that the client terminal 12 may perform processing by a script language without installing an application program. The client terminal 12 stores the client information relating to the client terminal 12. If the client terminal 12 is placed into the communication area of the content distribution apparatus 11, then the client terminal 12 transmits the client information to the content distribution apparatus 11. If a content is distributed from the content distribution apparatus 11 to the client apparatus 12, then the client terminal 12 displays the distributed content.

[Configuration of Content Distribution Apparatus]

Figure 2:
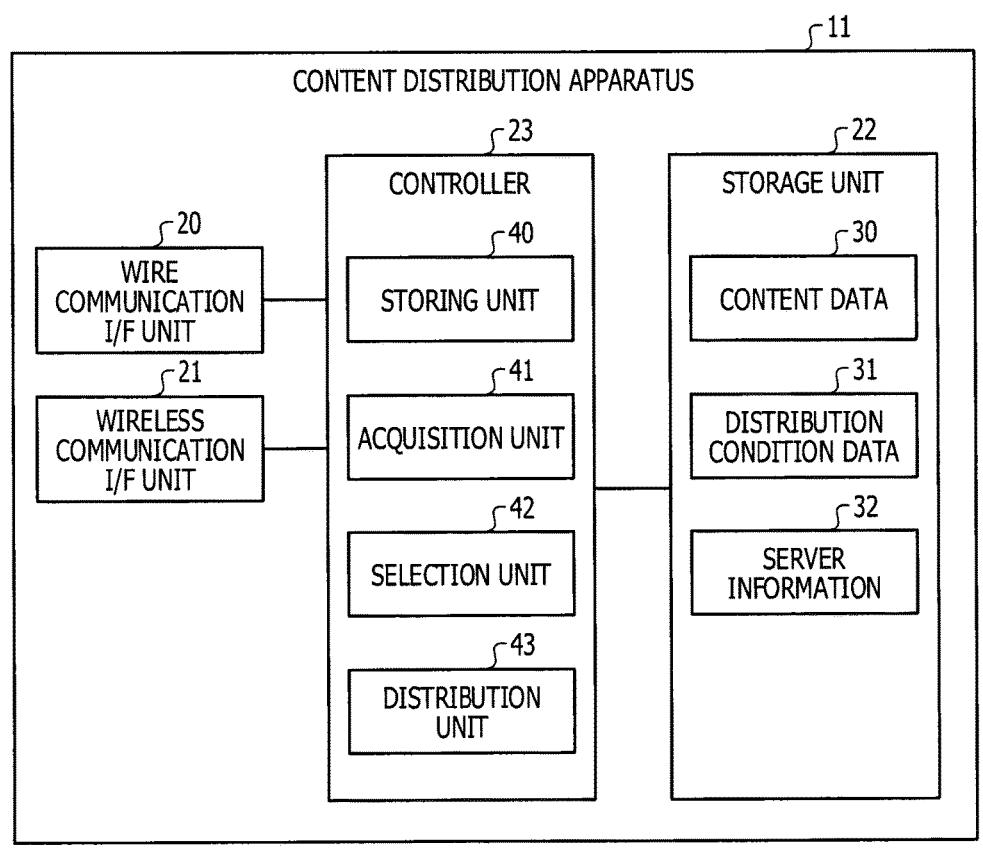
FIG. 2 depicts an example of a general configuration of a content distribution apparatus according to the first embodiment.

Now, a configuration of a content distribution apparatus according to the first embodiment is described. FIG. 2 depicts an example of a general configuration of a content distribution apparatus according to the first embodiment. The content distribution apparatus depicted in FIG. 2 may be the content distribution apparatus 11 depicted in FIG. 1. As depicted in FIG. 2, the content distribution apparatus 11 according to the first embodiment includes a wire communication interface (I/F) unit 20, a wireless communication I/F unit 21, a storage unit 22 and a controller 23. It is to be noted that the content distribution apparatus 11 may include not only the functional units depicted in FIG. 2 but also various functional units a known computer includes. For example, the content distribution apparatus 11 may include a display unit configured to display various kinds of information or an inputting unit configured to input various kinds of information.

The wire communication I/F unit 20 is an interface for performing control of wire communication with some other apparatus. The wire communication I/F unit 20 transmits and receives various kinds of information to and from some other apparatus through the network 13. For example, the wire communication I/F unit 20 performs transmission and reception of various kinds of data relating to a content to and from some other content distribution apparatus 11. As the wire communication I/F unit 20, a network interface card such as a wire LAN card can be adopted.

The wireless communication I/F unit 21 is an interface for performing control of wireless communication with some other apparatus. The wireless communication I/F unit 21 transmits and receives various kinds of information to and from some other apparatus by wireless communication. For example, the wireless communication I/F unit 21 performs transmission and reception of the client information or data of a content with the client terminal 12. As the wireless communication I/F unit 21, a network interface card such as a wireless LAN card can be adopted. An area within which wireless communication can be performed by the wireless communication I/F unit 21 is determined as the communication area. It is to be noted that, while wire communication is performed with some other content distribution apparatus 11 by the wire communication I/F unit 20 in the present embodiment, wireless communication may be performed with some other content distribution apparatus 11 by the wireless communication I/F unit 21. For example, the content distribution apparatus 11 may perform wireless communication with a wireless router by the wireless communication I/F unit 21 such that communication with some other content distribution apparatus 11 is performed through the wireless router.

The storage unit 22 is a storage device configured to store various kinds of data. For example, the storage unit 22 is a storage apparatus such as a hard disk, a solid state drive (SSD) or an optical disk. It is to be noted that the storage unit 22 may be a data-rewritable semiconductor memory such as a random access memory (RAM), a flash memory or a nonvolatile static random access memory (NVSRAM).

The storage unit 22 stores an operating system (OS) and various programs to be executed by the controller 23. For example, the storage unit 22 stores various programs including programs for executing a content distribution process and a selection process hereinafter described. Further, the storage unit 22 stores various kinds of data to be used by a program executed by the controller 23. For example, the storage unit 22 stores content data 30, distribution condition data 31 and server information 32.

The content data 30 is data of contents. For example, in the content data 30, data of coupons of shops on which the substance of special favors to be provided such as discounting is indicated is stored.

The distribution condition data 31 is data in which distribution conditions of contents are stored. In a content, a distribution condition when the content is distributed is set. For example, a requester who requests distribution of a content would set a distribution condition regarding to what target the content is to be distributed and uploads the content and the distribution condition for the content to the content distribution apparatus 11. In the distribution condition data 31, the distribution condition set to the content is stored.

FIG. 3 depicts an example of a data configuration of distribution condition data. As depicted in FIG. 3, "0003" is set as the content identification (ID) in the distribution condition data 31. To a content, a content ID is provided as identification information for identifying the content. As the content ID, a content ID of a content that is associated with the distribution condition is set. The example of FIG. 3 indicates a distribution condition to a content having the content ID "0003."

Further, in the distribution condition data 31, "Shop#1" is set as a shop ID. To a shop that performs distribution of a content, a unique shop ID is provided as identification information for identifying the shop. In the present embodiment, the shop ID is represented by adding a number to "Shop#." As the shop ID, a shop ID of a shop that is an issuance source of a content is set. The example of FIG. 3 indicates that the shop ID of the shop as the issuance source of the content is "Shop#1."

Further, in the distribution condition data 31, "Sv#1" is set as a download permission server. To the content distribution apparatus 11, a unique server ID is provided as identification information for identifying the content distribution apparatus 11. In the present embodiment, the server ID is represented by adding a number to "Sv#." As the download permission server, the server ID of the content distribution apparatus 11 that permits distribution of the content is set. The example of FIG. 3 indicates that distribution of the content from the content distribution apparatus 11 whose server ID is "Sv#1" is permitted.

Further, in the distribution condition data 31, "apparel" is set as a distribution desired type. A type of a business category of the shop is determined depending upon handled commodities or the substance of handled services. As the type of the business category, not only the apparel but also a book store, a restaurant, a drugstore, a grocery store and the like are available. As the distribution desired type, a type of a shop that performs distribution of a content is set. The example of FIG. 3 indicates that the distribution of a content is performed in a shop whose shop type is "apparel."

Further, in the distribution condition data 31, "Dec. 24, 2013" is set as a content creation date. As the content creation date, a date on which the content is created is set. The example of FIG. 3 indicates that the content was created on "Dec. 24, 2013."

Further, in the distribution condition data 31, "Jun. 1, 2014 to Jun. 30, 2014" is set as a content validity period. As the content validity period, a period within which distribution of the content is performed is set. The example of FIG. 3 indicates that distribution of the content is performed within a period from "Jun. 1, 2014" to "Jun. 30, 2014."

Further, in the distribution condition data 31, "0002" is set as a content update target. As the content update target, the content ID of the content for which updating is to be performed is set. The example of FIG. 3 indicates that the content whose content ID is "0002" is to be updated by a content whose content ID is "0003." The content update target is used, for example, when a coupon in the past is invalidated and a new coupon is issued, and the content ID of the coupon in the past is set in the content update target.

Further, in the distribution condition data 31, "first generation" is set as a current content generation. As the current content generation, it is set by what number of times the content has been copied between the content distribution apparatuses 11. The current content generation is counted up every time the content is copied between the content distribution apparatuses 11. The example of FIG. 3 indicates that the content is of the "first generation." The current content generation serves also as an index representative of the distance from the content distribution apparatus 11 in which the content is uploaded first.

Further, in the distribution condition data 31, "second generation" is set as a re-distributable generation. As the re-distributable generation, it is set by what number of generations the content is to be copied. The example of FIG. 3 indicates that the content can be copied between the content distribution apparatuses 11 up to the "second generation."

Further, in the distribution condition data 31, "once" is set as a re-distributable time number. As the re-distributable time number, it is set by what number of times the content can be copied into some other content distribution apparatus 11. The example of FIG. 3 indicates that the content can be copied once to some other content distribution apparatus 11.

Further, in the distribution condition data 31, "validity period run out, generation run out, time number run out, no copy destination for fixed time period" is set as a deletion condition. As the deletion condition, it is set by what condition the content is to be deleted. The example of FIG. 3 indicates that the content is deleted in one of a case in which a content validity period expires, another case in which copying in a re-distributable generation is completed, a further case in which the content is copied by the re-distributable time number and a still further case in which there is no copy destination for a fixed time period.

Referring back to FIG. 2, the server information 32 is data in which various kinds of information relating to the content distribution apparatus 11 are stored. In the server information 32, information relating each of the content distribution apparatuses 11, information corresponding to a disposition position and information obtained by communication with the client terminal 12 are stored.

FIG. 4 depicts an example of a data configuration of server information. As depicted in FIG. 4, "Sv#1" is set as the server ID in the server information 32. As the server ID, the server ID of the content distribution apparatus 11 is set. The example of FIG. 4 indicates that the server ID of the content distribution apparatus 11 is "Sv#1."

Further, in the server information 32, "Shop#1" is set as a shop ID. As the shop ID, a shop ID of a shop in which the content distribution apparatus 11 is installed is set. The example of FIG. 4 indicates that the shop ID of the shop in which the content distribution apparatus 11 is installed is "Shop#1."

Further, in the server information 32, "apparel" is set as a shop type. As the shop type, a type of a business category is set in accordance with handled commodities or the substance of handled services. The example of FIG. 4 indicates that the type of the shop in which the content distribution apparatus 11 is installed is "apparel."

Further, in the server information 32, "0003, 0001" is set as a retention content ID list. In the retention content ID list, a content ID of a content stored as the content data 30 in the storage unit 22 of the content distribution apparatus 11 is set. The example of FIG. 4 indicates that contents whose content IDs are "0003" and "0001" are stored in the content data 30.

Further, in the server information 32, "Long. 139.765 . . . E, Lat. 35.6723 . . . N" is set as position information. As the position information, position information of a position at which the content distribution apparatus 11 is disposed is set. In the present embodiment, values of the position represented in longitude (east longitude) and latitude (north latitude) are set as the position information. The example of FIG. 4 indicates that the position at which the content distribution apparatus 11 is disposed is "Long. 139.765 . . . E" and "Lat. 35.6723 . . . N."

Further, in the server information 32, "Sv#2→Sv#1," "Sv#2→Sv#3→Sv#1" and "Sv#3→Sv#2→Sv#1" are set as a user visit history. As the user visit history, information of a movement path regarding along what visit destinations the client terminal 12 has reached the content distribution apparatus 11 is set. In the present embodiment, it is assumed that a visit destination is a shop visited by the user and the information of the movement path is recorded using the server ID of the content distribution apparatus 11 provided in the visited shop. In the example of FIG. 4, "Sv#2→Sv#1" indicates that the user moved from the shop in which the content distribution apparatus 11 whose server ID is "Sv#2" is installed to another shop in which the content distribution apparatus 11 whose server ID is "Sv#1" is installed. The user visit history represents an adjacent relationship of visit destinations on the movement path of the user.

Referring back to FIG. 2, the controller 23 is a device configured to control the content distribution apparatus 11. As the controller 23, an electronic circuit such as a central processing unit (CPU) or a micro processing unit (MPU) or an integrated circuit such as an application specific integrated circuit (ASIC) and a field programmable gate array (FPGA) can be adopted. The controller 23 includes an internal memory for storing a program that prescribes various processing procedures and control data therein, and executes various processes on the basis of the stored program and data. The controller 23 functions as various processing units by operation of the various programs. For example, the controller 23 includes a storing unit 40, an acquisition unit 41, a selection unit 42 and a distribution unit 43.

The storing unit 40 performs storage of various kinds of data. For example, the storing unit 40 stores an uploaded content and a distribution condition for the content into the content data 30 and the distribution condition data 31, respectively. Further, the storing unit 40 performs communication with the storing unit 40 of some other content distribution apparatus 11 by P2P communication and shares the content. In particular, the storing unit 40 acquires a content stored in some other content distribution apparatus 11 but not stored in the subject content distribution apparatus 11 and a distribution condition for the content and stores the acquired content and distribution condition into the content data 30 and the distribution condition data 31, respectively.

The acquisition unit 41 performs acquisition of various kinds of data. For example, the acquisition unit 41 acquires client information from a client terminal 12 within the communication area. The client information may be autonomously transmitted taking as a trigger that it is detected that the client terminal 12 enters the communication area. Further, the acquisition unit 41 may request transmission of the client information to the client terminal 12 and the client terminal 12 may transmit the client information in accordance with the request.

The selection unit 42 performs various kinds of selection. For example, the selection unit 42 selects a content of a distribution target from the content data 30 stored in the storage unit 22 on the basis of the client information acquired by the acquisition unit 41. For example, the selection unit 42 determines an adjacent relationship of a visit destination on a movement path from the user visit history stored in the storage unit 22 of the content distribution apparatus 11. Then, the selection unit 42 selects a content of a distribution target on the basis of the adjacent relationship of the visit destination on the movement path. For example, the selection unit 42 extracts a content relating to the visit destination in accordance with an adjacent order on the movement path from the subject content distribution apparatus 11 and selects, as a content of a distribution target, a content relating to a visit destination that is not retained by the client terminal 12. It is to be noted that the selection unit 42 may select a content relating to a visit destination in accordance with the adjacent order on the movement path irrespective of whether the client terminal 12 retains the content.

The distribution unit 43 performs distribution of various kinds of data. For example, the distribution unit 43 distributes a content or contents selected by the selection unit 42 to the client terminal 12 on the basis of the distribution condition. For example, the distribution unit 43 distributes any content satisfying a distribution condition such as a validity period of the content, a type of a distribution destination that is a distribution target and a distribution range set as the distribution condition for the content from among the selected contents together with the distribution condition for the content to the client terminal 12.

[Configuration of Client Terminal]

Figure 5:
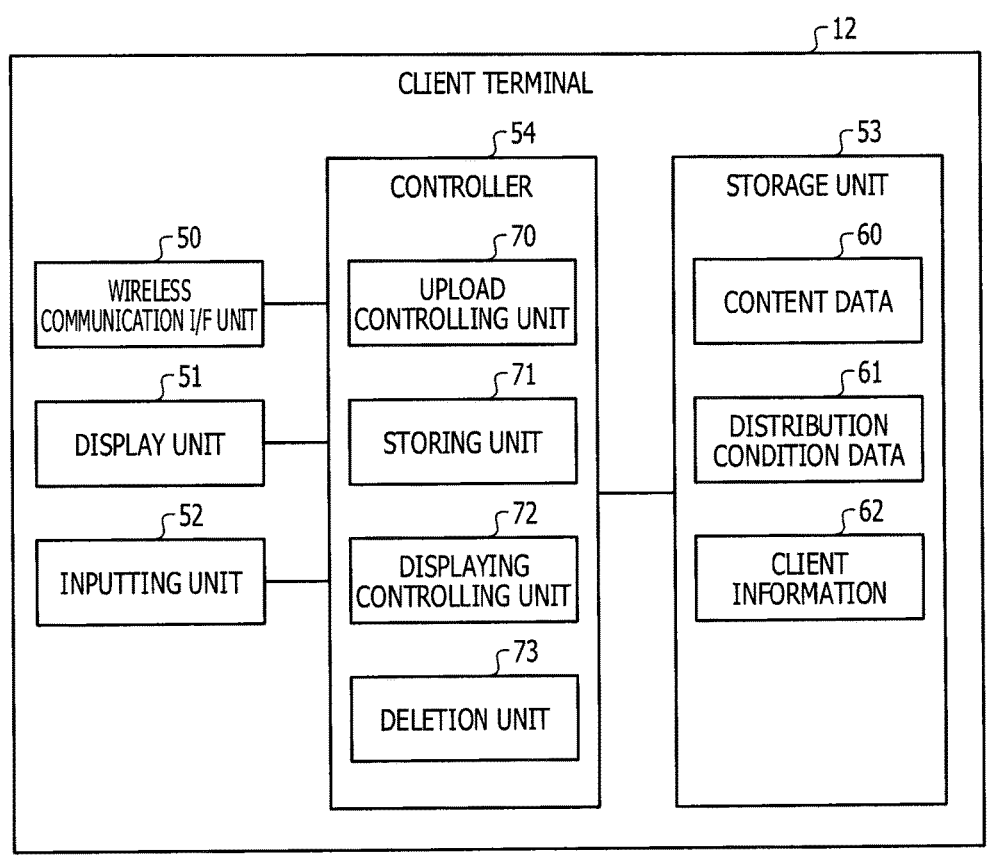
FIG. 5 depicts an example of a general configuration of a client terminal according to the first embodiment.

Now, a configuration of a client terminal according to the first embodiment is described. FIG. 5 depicts an example of a general configuration of a client terminal according to the first embodiment. The client terminal depicted in FIG. 5 may be the client terminal 12 depicted in FIG. 1. As depicted in FIG. 5, the client terminal 12 includes a wireless communication I/F unit 50, a display unit 51, an inputting unit 52, a storage unit 53 and a controller 54. It is to be noted that the client terminal 12 may include not only the functional units depicted in FIG. 5 but also various functional units which a known portable terminal apparatus includes.

The wireless communication I/F unit 50 is an interface for performing control of wireless communication with some other apparatus. The wireless communication I/F unit 50 transmits and receives various kinds of information to and from some other apparatus by wireless communication. For example, the wireless communication I/F unit 50 performs transmission and reception of client information or data of a content to and from the content distribution apparatus 11 if the client terminal 12 enters the communication area of the content distribution apparatus 11. As the wireless communication I/F unit 50, a network interface card such as a wireless LAN card can be adopted.

The display unit 51 is a display device configured to display various kinds of information. As the display unit 51, a display device such as a liquid crystal display (LCD) unit is available. The display unit 51 displays various kinds of information. For example, the display unit 51 displays a distributed content.

The inputting unit 52 is an inputting device configured to input various kinds of information. For example, as the inputting unit 52, an inputting device such as various buttons provided on the client terminal 12 or a transmission type touch sensor provided on the display unit 51 is available. It is to be noted that, while the display unit 51 and the inputting unit 52 are provided separately from each other in the example of FIG. 5 because FIG. 5 depicts the functional configuration, the display unit 51 and the inputting unit 52 may be configured as a device in which the display unit 51 and the inputting unit 52 are integrally provided like, for example, a touch panel.

The storage unit 53 is a storage device configured to store various kinds of data. For example, the storage unit 53 is a storage apparatus such as a hard disk, an SSD or an optical disk. It is to be noted that the storage unit 53 may be a data-rewritable semiconductor memory such as a RAM, a flash memory or an NVSRAM.

The storage unit 53 stores an OS and various programs to be executed by the controller 54. For example, the storage unit 53 stores various programs including a program for executing a distribution requesting process hereinafter described. Further, the storage unit 53 stores various kinds of data to be used by a program executed by the controller 54. For example, the storage unit 53 stores content data 60, distribution condition data 61 and client information 62.

The content data 60 is data of a content distributed from the content distribution apparatus 11. For example, in the content data 60, distributed data of a coupon is stored.

The distribution condition data 61 is data in which a distribution condition distributed together with a content from the content distribution apparatus 11 is stored. For example, in the distribution condition data 61, a distribution condition such as a validity period of a distributed content, a type of a distribution destination that is a distribution target and a distribution range is stored.

The client information 62 is data in which various kinds of information relating to the client terminal 12 are stored. In the client information 62, information of contents retained by the client terminal 12 and movement path information relating to movement of the client terminal 12 are stored.

FIG. 6 depicts an example of a data configuration of client information. As depicted in FIG. 6, in the client information 62, "0003, 0001" is set as a retention content ID list. In the retention content ID list, a content ID of each content retained by the client terminal 12 is set. The example of FIG. 6 indicates that contents whose content IDs are "0003" and "0001" are retained in the client information 62.

Further, in the client information 62, "Sv#2→Sv#1" is set as a user visit path. In the user visit path, information of a movement path regarding along what visit destination the client terminal 12 passes is set. For example, in the user visit path, information of a given number of latest visit destinations is set. In the example of FIG. 6, "Sv#2→Sv#1" indicates that the user moved from a shop in which the content distribution apparatus 11 whose server ID is "Sv#2" is provided to another shop in which the content distribution apparatus 11 whose server ID is "Sv#1" is provided.

Referring back to FIG. 5, the controller 54 is a device configured to control the client terminal 12. As the controller 54, an electronic circuit such as a CPU or an MPU or an integrated circuit such as an ASIC or an FPGA can be adopted. The controller 54 includes an internal memory for storing programs in which various processing procedures are prescribed and control data therein and executes various processes using the stored programs and data. The controller 54 functions as various processing units by operation of the various programs. For example, the controller 54 includes an upload controlling unit 70, a storing unit 71, a displaying controlling unit 72 and a deletion unit 73.

The upload controlling unit 70 controls uploading of various kinds of data. For example, the upload controlling unit 70 periodically performs detection of a communication area. For example, the upload controlling unit 70 detects a given wireless radio wave outputted from the content distribution apparatus 11. If a communication area is detected, then the upload controlling unit 70 establishes a coupling (establishes a communication) with the content distribution apparatus 11 in the detected communication area. Then, the upload controlling unit 70 uploads the client information 62 to the content distribution apparatus 11. The content distribution apparatus 11 distributes a content and a distribution condition for the content in response to the uploading.

The storing unit 71 performs storage of various kinds of data. For example, the storing unit 71 stores the distributed content and distribution condition for the content into the content data 60 and the distribution condition data 61, respectively.

The displaying controlling unit 72 performs various kinds of display control. For example, the displaying controlling unit 72 controls the display unit 51 to display the content of the content data 60. Further, the displaying controlling unit 72 changes the substance displayed on the display unit 51 in response to an operation inputted to the inputting unit 52.

The deletion unit 73 performs deletion of various kinds of data. For example, the deletion unit 73 deletes a content that satisfies a deletion condition included in the distribution condition and the distribution condition for the content from the content data 60 and the distribution condition data 61, respectively.

Figure 7:
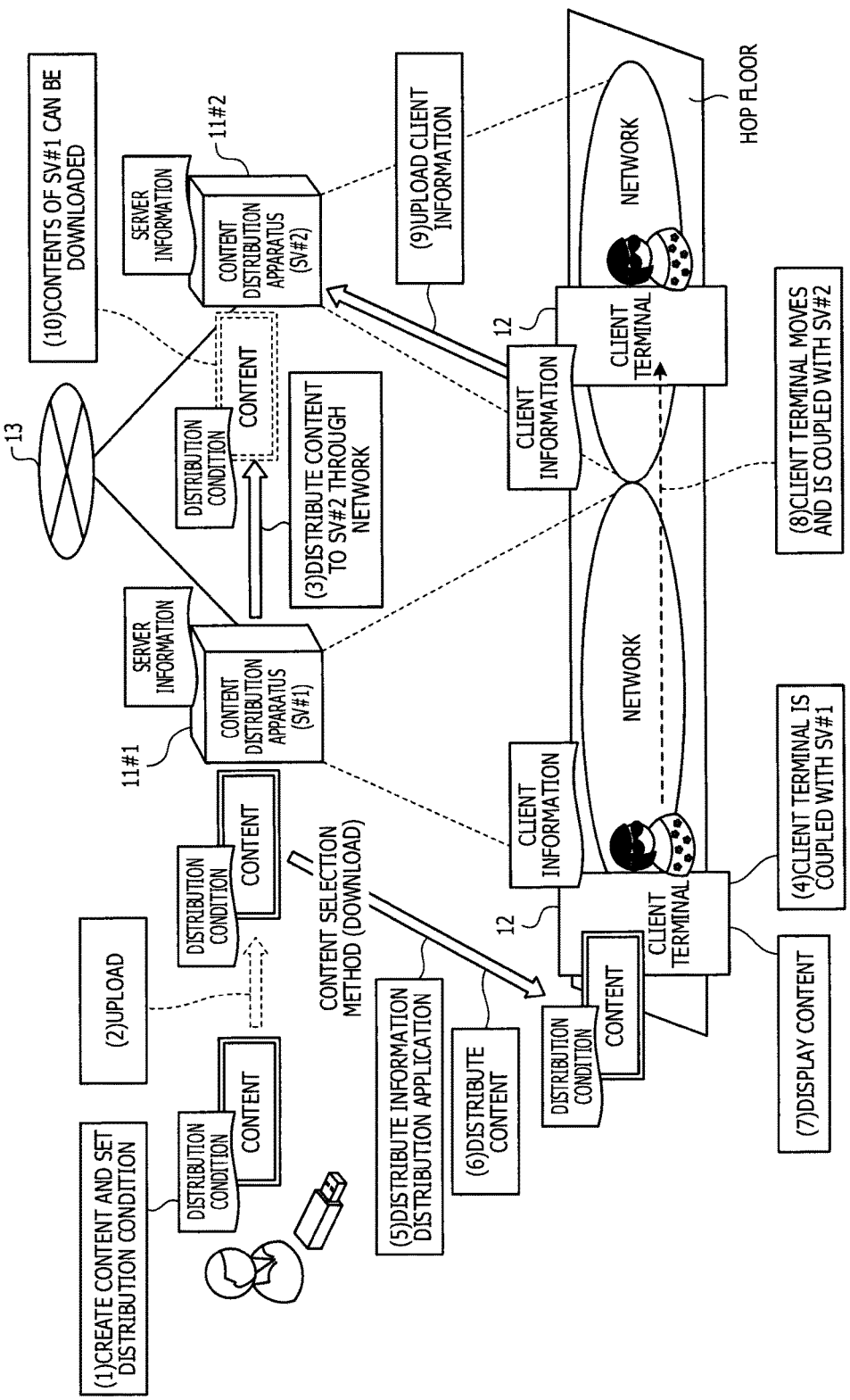
FIG. 7 depicts an example of a flow when a content distribution system according to the first embodiment distributes a content.

Now, the present embodiment is described using a particular example. FIG. 7 depicts an example of a flow when a content distribution system according to the first embodiment distributes a content. It is assumed in the following description that the server ID of the content distribution apparatus 11#1 and the server ID of the content distribution apparatus 11#2 are "Sv#1" and "Sv#2," respectively.

A requester who requests distribution of a content creates a content and sets a distribution condition for the content (1). For example, the requester creates a content relating to a shop in which the content distribution apparatus 11#1 is disposed and sets a distribution condition for the content. Then, the requester uploads the created content and distribution condition for the content to the content distribution apparatus 11 (2). In the example of FIG. 7, the content and the distribution condition are uploaded to the content distribution apparatus 11#1 using a universal serial bus (USB) memory. It is to be noted that the uploading (2) method is not limited to the method described above. For example, the content and the distribution condition may be uploaded to the content distribution apparatus 11#1 using an external storage such as a secure digital (SD) memory card, the wire communication I/F unit 20 or the wireless communication I/F unit 21 through a network attached storage (NAS), a cloud storage, a web application programming interface (Web API) or the like.

The content distribution apparatus 11#1 performs communication with the content distribution apparatus 11#2 by P2P communication and distributes the uploaded content and distribution condition to the content distribution apparatus 11#2 (3). Consequently, the content relating to the shop in which the content distribution apparatus 11#1 is disposed is stored in both of the content distribution apparatuses 11#1 and 11#2.

If the client terminal 12 enters the communication area of the content distribution apparatus 11#1 by movement of the user, then the client terminal 12 establishes a coupling with the content distribution apparatus 11#1 (4). The content distribution apparatus 11#1 distributes an application program for information distribution to the client terminal 12 (5). In the client terminal 12, the application program for information distribution is executed and client information relating to the client terminal 12 is created. Since the execution of the application program for information distribution has started only recently, only "Sv#1" is recorded as the user visit path into the client information. The client terminal 12 transmits the client information to the content distribution apparatus 11#1. The content distribution apparatus 11#1 distributes the content and the distribution condition for the content to the client terminal 12 (6). Here, in the content distribution apparatuses 11#1 and 11#2, information is not initially stored in the user visit path of the server information 32. In this case, the content distribution apparatuses 11#1 and 11#2 individually select a content in accordance with a given rule or at random and distribute a result of the selection to the client terminal 12. For example, the content distribution apparatuses 11#1 and 11#2 distribute own contents to the client terminal 12.

In the client terminal 12, the distributed contents are displayed (7).

If the client terminal 12 enters the communication area of the content distribution apparatus 11#2 by a movement of the user, then the client terminal 12 establishes a coupling with the content distribution apparatus 11#2 (8). The client terminal 12 uploads the client information to the content distribution apparatus 11#2 (9). In the client information, "Sv#1→Sv#2" is recorded as the user visit path. In the content distribution apparatus 11#2, a user visit history of the client information is stored into the user visit history of the server information 32. In the example of FIG. 7, the content distribution apparatus 11#2 stores "Sv#1→Sv#2" into the user visit path of the server information 32. Consequently, the content distribution apparatus 11#2 is then enabled to distribute contents of the shop in which the content distribution apparatus 11#1 is disposed (10). For example, if a user who has not visited the shop of the content distribution apparatus 11#1 visits a shop of the content distribution apparatus 11#2, then the content distribution apparatus 11#2 distributes contents of the shop of the content distribution apparatus 11#1.

Here, the user would visit a shop in which the user is interested. Therefore, relevant shops are recorded on a movement path of the user. Thus, the content distribution apparatus 11 can distribute a content of a relevant shop that attracts an interest of the user by selecting a content in accordance with an adjacent order of the movement path of the user. Further, the content distribution apparatus 11 can distribute the content within a range of the relevant shop that attracts an interest of the user, and can control the distribution range of the content to an effective range.

Figure 8:
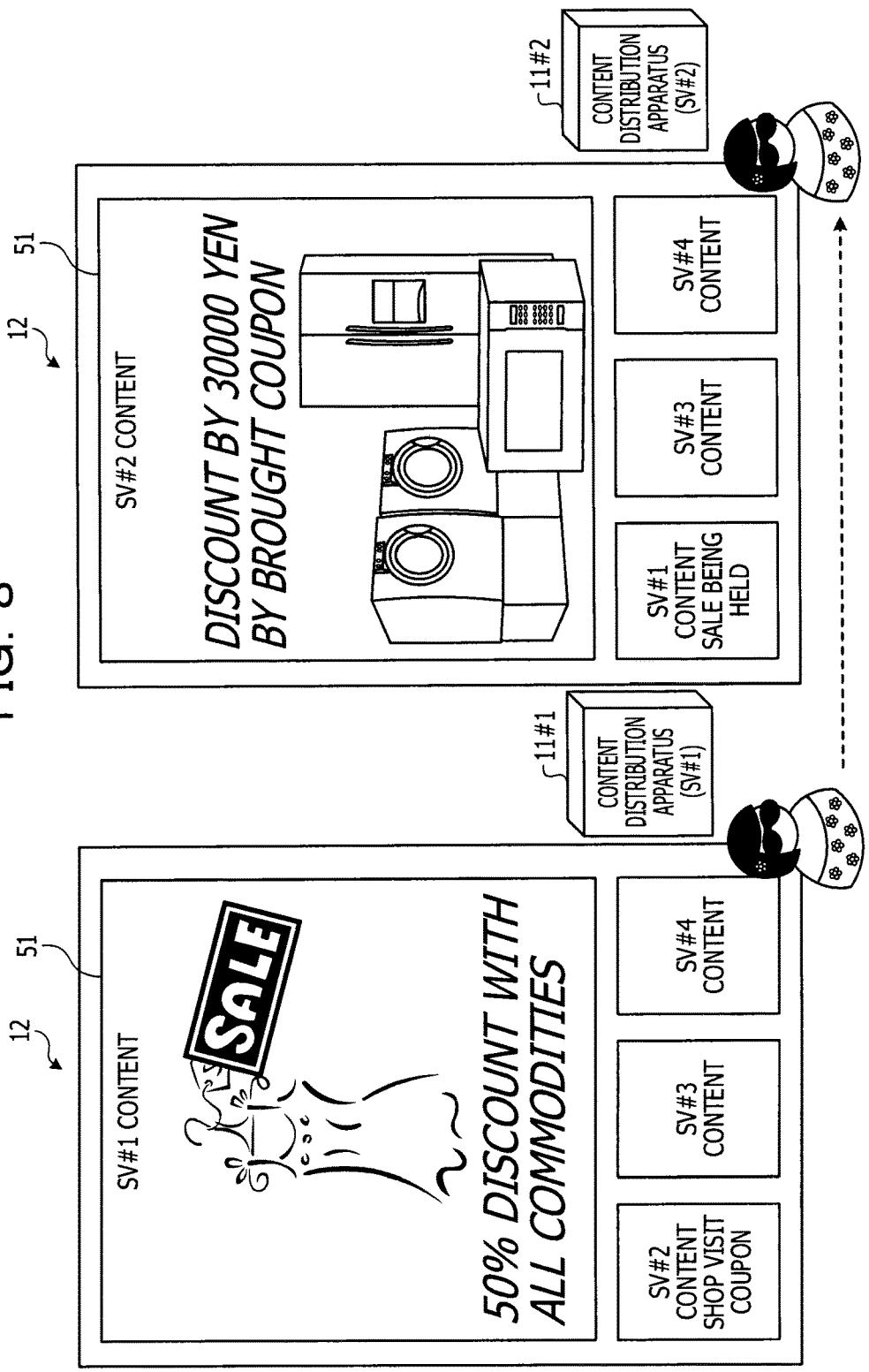
FIG. 8 depicts an example of an application program for information distribution and contents to be distributed.

FIG. 8 depicts an example of an application program for information distribution and contents to be distributed. It is to be noted that the example of FIG. 8 indicates a case in which the content distribution apparatuses 11#1 and 11#2 select and distribute contents relevant to the visit destination in accordance with an adjacent order along the movement path irrespective of whether the contents are retained in the client terminal 12. In the example of FIG. 8, a state is indicated in which the application program for information distribution is started up on the display unit 51 of the client terminal 12. Distributed contents are displayed in a juxtaposed relationship at a lower portion of the application program for information distribution and a content selected by user operation is displayed at an upper portion. As depicted at the left side in FIG. 8, where the user visits the shop of the content distribution apparatus 11#1, contents (Sv#2 to Sv#4) of shops adjacent to the shop of the content distribution apparatus 11#1 along the movement path of the user are displayed on the display unit 51 of the client terminal 12 together with the content (Sv#1) of the shop where the user is present. Further, as depicted at the right side in FIG. 8, where the user visits the shop of the content distribution apparatus 11#2, contents (Sv#1, Sv#3 and Sv#4) of shops adjacent to the shop of the content distribution apparatus 11#2 along the movement path of the user are displayed in the application program for information distribution together with the content (Sv#2) of the shop where the user is present. In this manner, the content distribution apparatus 11 can distribute contents of shops located along the movement path of the user and causes the client terminal 12 to display the distributed contents. Consequently, it is possible to cause the user to be more interested in the distributed contents than in an alternative case in which, for example, contents of neighboring shops are distributed simply.

[Flow of Processing]

Figure 9:
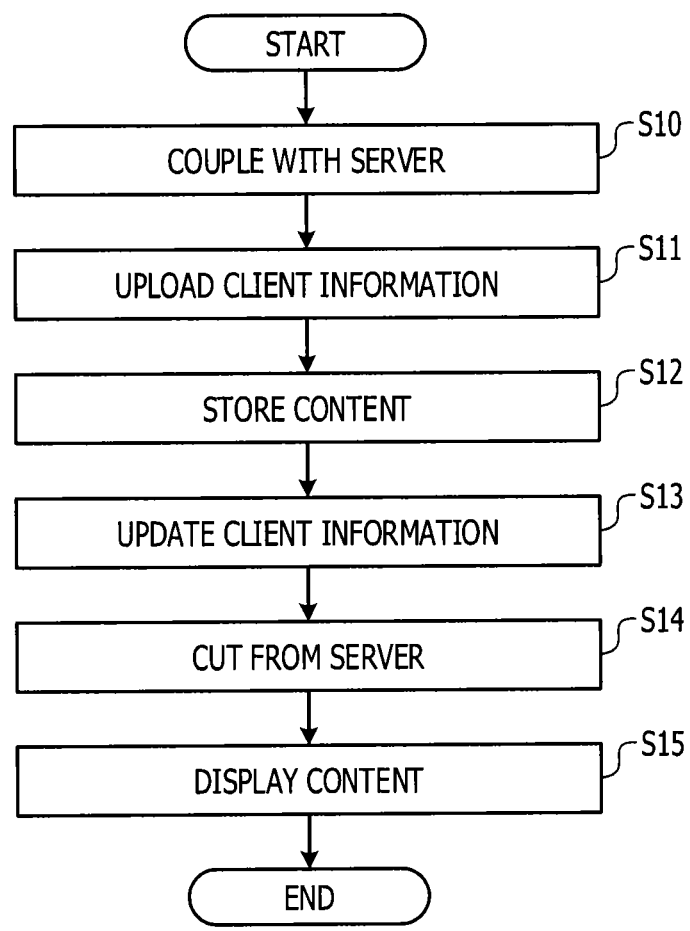
FIG. 9 is a flow chart illustrating an example of a procedure of a distribution requesting process.

Now, a flow of processing executed by a content distribution system according to the first embodiment is described. First, a flow of a distribution requesting process when a client terminal requests distribution of a content is described. FIG. 9 is a flow chart illustrating an example of a procedure of the distribution requesting process. The content distribution system and the client terminal described with reference to FIG. 9 may be the content distribution system 10 and the client terminal 12, respectively, depicted in FIG. 1. The distribution requesting process is executed at a given timing, for example, at a timing at which the communication area of the content distribution apparatus 11 is detected.

As depicted in FIG. 9, the upload controlling unit 70 establishes a coupling with the content distribution apparatus 11 within the detected communication area (S10). The upload controlling unit 70 uploads the client information 62 to the content distribution apparatus 11 (S11). The content distribution apparatus 11 distributes contents and distribution conditions of the contents in response to the uploaded client information.

The storing unit 71 stores the distributed contents and the distribution conditions of the contents into the content data 60 and the distribution condition data 61, respectively (S12). The storing unit 71 updates the client information 62 in accordance with the distributed contents (S13). The storing unit 71 cuts the coupling with the content distribution apparatus 11 (S14). The displaying controlling unit 72 causes the display unit 51 to display the contents of the content data 60 (S15), and the processing is ended.

Figure 10:
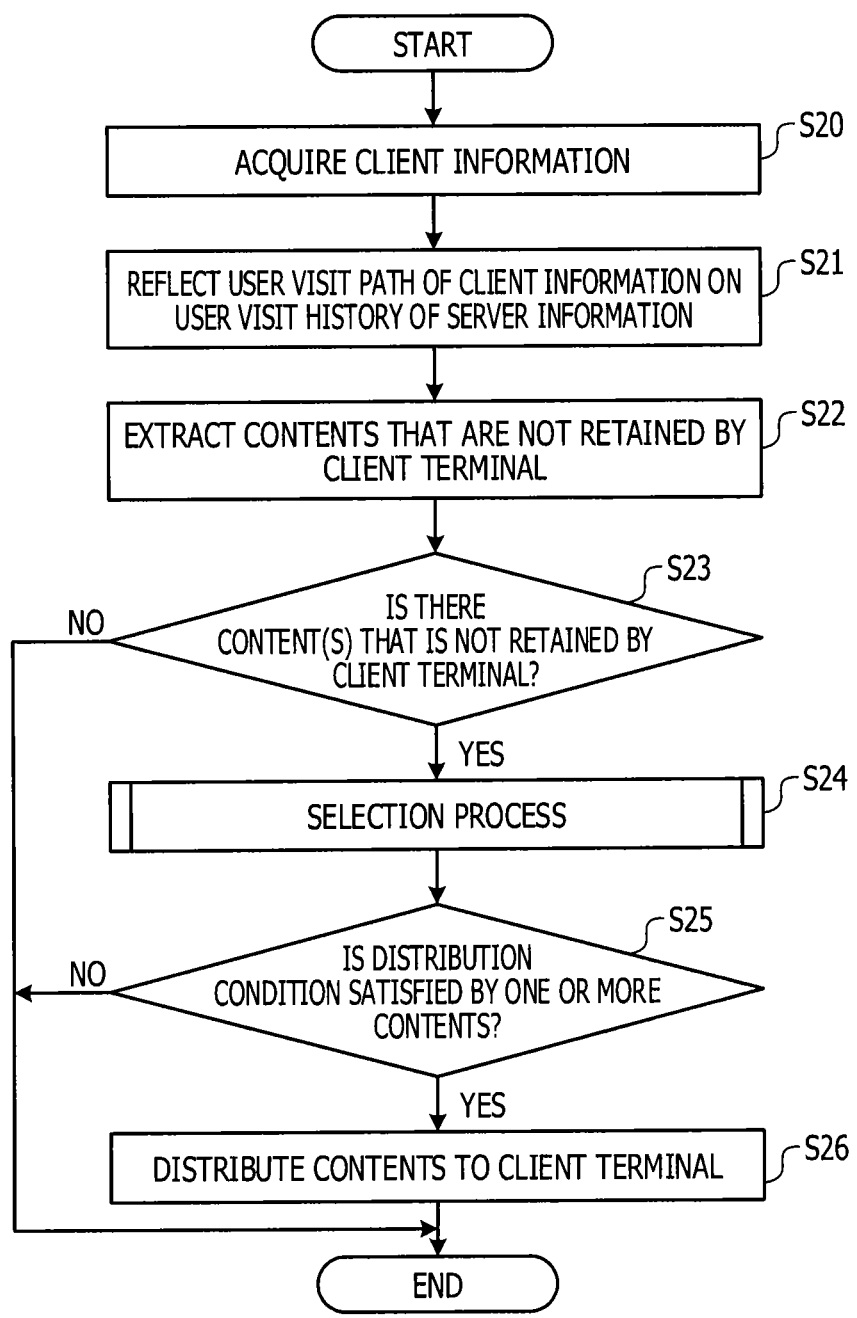
FIG. 10 is a flow chart illustrating an example of a procedure of a content distribution process.

Now, a flow of a content distribution process when a content distribution apparatus distributes a content is described. FIG. 10 is a flow chart illustrating an example of a procedure of the content distribution process. The content distribution apparatus described with reference to FIG. 10 may be the content distribution apparatus 11 depicted in FIG. 1. The content distribution process is executed at a given timing, for example, at a timing at which the client information 62 is uploaded from the client terminal 12.

As depicted in FIG. 10, the acquisition unit 41 acquires the client information 62 from the client terminal 12 (S20). The acquisition unit 41 adds data of a user visit path in the client information 62 to a user visit history in the server information 32 (S21).

The selection unit 42 extracts contents that are not retained by the client terminal 12 on the basis of the client information 62 (S22).

The selection unit 42 decides, on the basis of a result of the extraction, whether or not there is a content or contents that are not retained by the client terminal 12 (S23). If there is no content that is not retained by the client terminal 12 (No at step S23), then the processing is ended.

If there is a content or contents that are not retained by the client terminal 12 (Yes at step S23), then the selection unit 42 performs a selection process to select contents of a distribution target (S24). Details of the selection process are hereinafter described. The distribution unit 43 decides whether or not the distribution condition is satisfied by one or more of the selected contents (S25). If the distribution condition is satisfied by none of the selected contents (No at step S25), then the processing is ended.

If the distribution condition is satisfied by one or more of the selected contents (Yes at step S25), on the other hand, the distribution unit 43 distributes the contents that satisfy the distribution condition to the client terminal 12 together with the distribution conditions for the contents (S26), and then the processing is ended.

Figure 11:
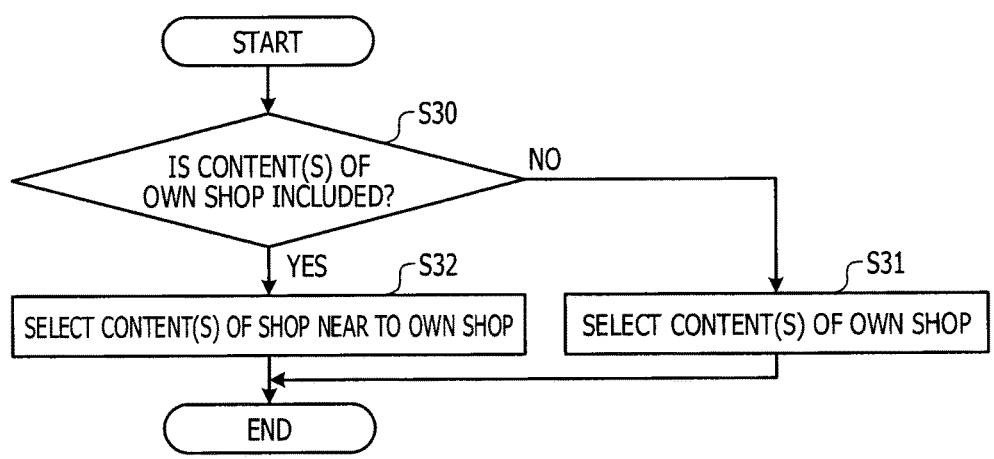
FIG. 11 is a flow chart illustrating an example of a procedure of a selection process.

Now, a flow of the selection process when the content distribution apparatus 11 selects a content of a distribution target is described. FIG. 11 is a flow chart illustrating an example of a procedure of the selection process. The selection process is executed at a given timing, for example, at step S24 of the content distribution process depicted in FIG. 10. It is to be noted that the selection process is not limited to the procedure depicted in FIG. 11.

As depicted in FIG. 11, the selection unit 42 decides whether or not a content or contents of the own shop are included in contents that are not retained by the client terminal 12 (S30). If a content or contents of the own shop are included (Yes at step S30), then the selection unit 42 selects a content or contents in a shop nearest to the own shop on the movement path (S32), and the processing is ended.

If a content or contents of the own shop are not included (No at step S30), on the other hand, the selection unit 42 selects the content or contents of the own shop (S31), and then the processing is ended. It is to be noted that the selection process is not limited to the procedure depicted in FIG. 11. For example, the selection unit 42 may select a given number of contents of the own shop and contents of a shop near to the own shop on the movement path.

[Effects]

As described above, the content distribution apparatus 11 according to the present embodiment stores contents and distribution conditions of the contents into the storage unit 22. The content distribution apparatus 11 acquires the client information 62 relating to the client terminal 12 from the client terminal 12. The content distribution apparatus 11 selects contents of a distribution target from within the storage unit 22 on the basis of the acquired client information 62. The content distribution apparatus 11 distributes the selected contents to the client terminal 12 on the basis of the distribution condition. Consequently, the content distribution apparatus 11 can control the distribution range of each content.

Further, the content distribution apparatus 11 stores an adjacent relationship on the movement path of visit destinations of the client terminal 12 specified from the movement path information included in the acquired client information 62 into the storage unit 22. The content distribution apparatus 11 selects a content or contents of a distribution target on the basis of the adjacent relationship on the movement path of the visit destinations stored in the storage unit 22. Consequently, the content distribution apparatus 11 can control the distribution range of each content to a range along the movement path of the client terminal 12.

Further, the content distribution apparatus 11 according to the present embodiment selects a content or contents not retained by the client terminal 12 as a content or contents of a distribution target on the basis of the client information 62. Consequently, the content distribution apparatus 11 can distribute the content or contents not retained by the client terminal 12.

Further, the content distribution apparatus 11 according to the present embodiment distributes a content or contents that satisfy a distribution condition determining a validity period of the content, a type of a distribution destination that is a distribution target, a distribution range or any combination thereof. Consequently, the content distribution apparatus 11 can distribute an effective content or contents that satisfy the distribution condition. Further, the content distribution apparatus 11 can suppress distribution of an unnecessary content that does not satisfy the distribution condition.

Second Embodiment

Now, a second embodiment is described. It is to be noted that like elements to the elements in the first embodiment are denoted by like reference symbols and the following description is given principally of differences.

[Configuration of System]

Figure 12:
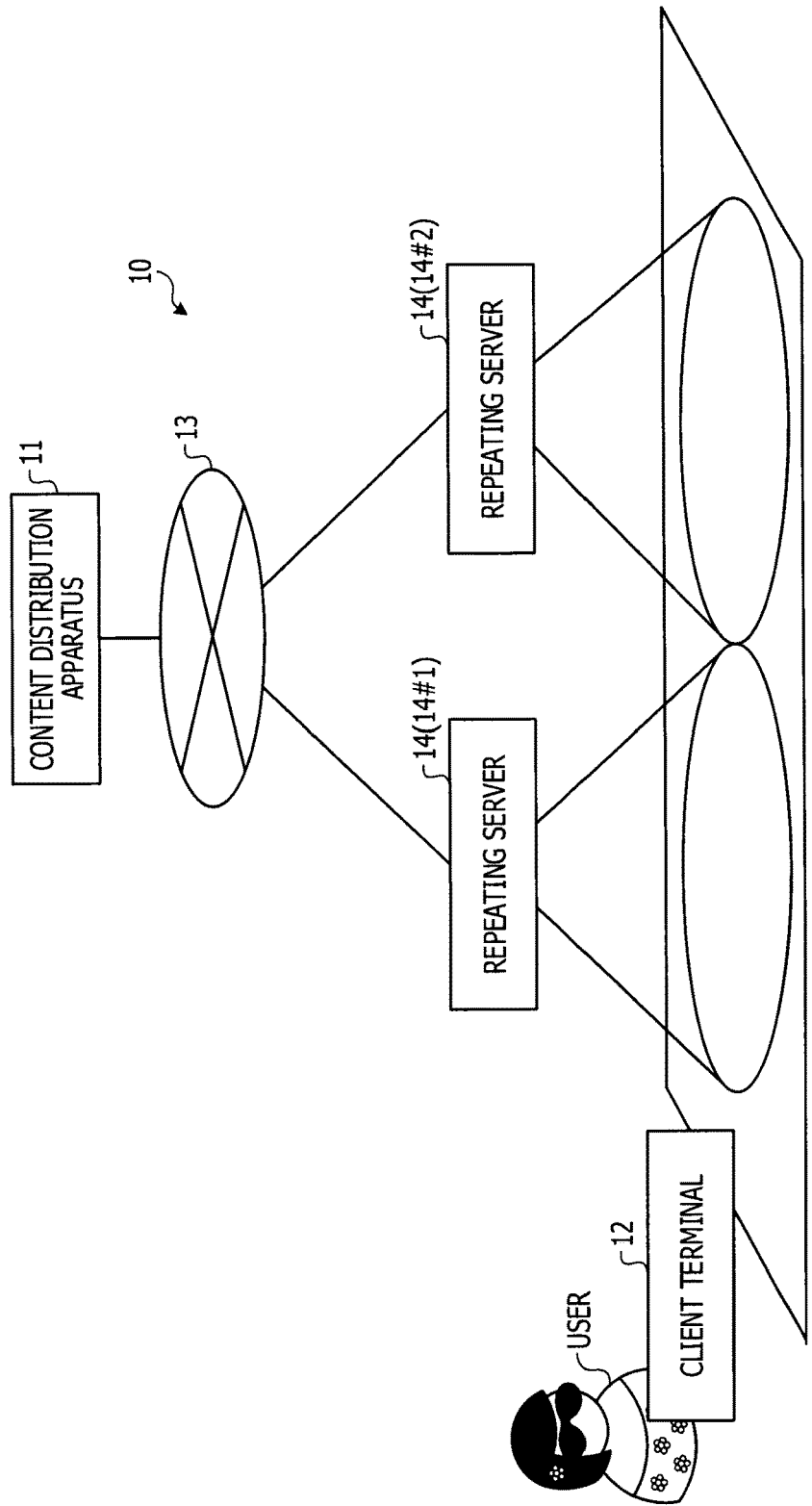
FIG. 12 depicts an example of a general configuration of an entire content distribution system according to a second embodiment.

FIG. 12 depicts an example of a general configuration of an entire content distribution system according to the second embodiment. Referring to FIG. 12, a content distribution system 10 according to the second embodiment includes a content distribution apparatus 11, a client terminal 12 and a plurality of repeating servers 14. The content distribution apparatus 11 and each of the plurality of repeating servers 14 are coupled for communication by a network 13 such that various kinds of information can be exchanged therebetween. It is to be noted that, while two repeating servers 14 (14#1 and 14#2) are depicted in the example of FIG. 12, the number of repeating servers 14 may be set to an arbitrary number. Further, while the number of content distribution apparatuses 11 is one in the example of FIG. 12, the number of content distribution apparatuses 11 is not limited to one, and the content distribution apparatus 11 may have a configuration of a cloud configured from a plurality of computers.

Each repeating server 14 is a physical server that performs repeating of various kinds of data and is, for example, a server computer. The repeating server 14 is disposed in a target area in which distribution of a content is performed. For example, the repeating server 14 is disposed in a shop from which a coupon is distributed. It is to be noted that the number of repeating servers 14 disposed in a target area is not limited to one but may be a plural number.

The repeating server 14 has a communication area formed therearound, in which the repeating server 14 can communicate. In the example of FIG. 12, the communication area of each repeating server 14 is indicated by an ellipse. The repeating server 14 repeats transfer of data between the content distribution apparatus 11 and the client terminal 12. For example, the repeating server 14 acquires client information regarding the client terminal 12 from the client terminal 12 in the communication area and transmits the client information to the content distribution apparatus 11. Further, the repeating server 14 transmits a content distributed from the content distribution apparatus 11 to the client terminal 12 in the communication area.

Each of the repeating servers 14 has a unique server ID allocated thereto as identification information for the identification of the repeating server 14. When the repeating server 14 performs repeating of data, the repeating server 14 adds the server ID of the repeating server 14 to the data. The client terminal 12 stores the server ID added to the data as information of a visit destination to a user visit path in client information 62. The content distribution apparatus 11 specifies, from the server ID added to the data, the repeating server 14 by which the data has been repeated.

[Configuration of Content Distribution Apparatus]

Figure 13:
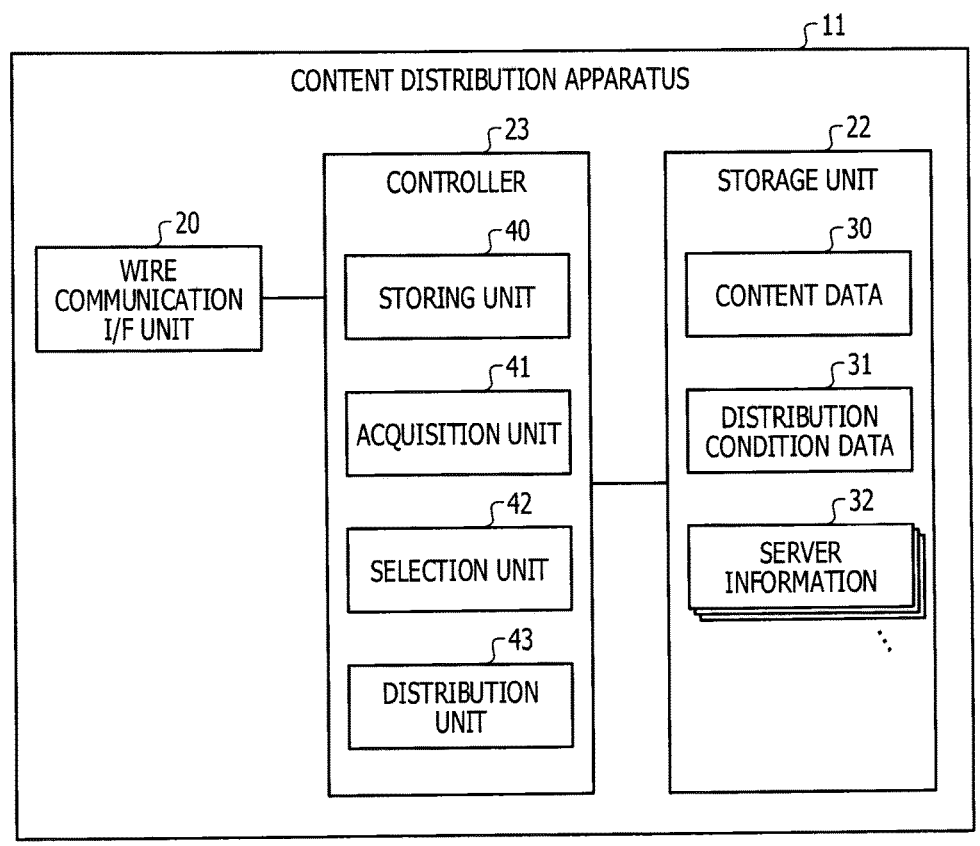
FIG. 13 depicts an example of a general configuration of a content distribution apparatus according to the second embodiment.

Now, a configuration of a content distribution apparatus in the second embodiment is described. FIG. 13 depicts an example of a general configuration of a content distribution apparatus according to the second embodiment. The content distribution apparatus depicted in FIG. 13 may be the content distribution apparatus 11 depicted in FIG. 12. Referring to FIG. 13, the content distribution apparatus 11 according to the second embodiment is same as the content distribution apparatus 11 in the first embodiment depicted in FIG. 2 except that the wireless communication I/F unit 21 is removed.

The wire communication I/F unit 20 receives client information from the client terminal 12 through the repeating server 14 and transmits a content to the client terminal 12 through the repeating server 14.

The storage unit 22 has server information 32 of the repeating servers 14 stored therein.

The storing unit 40 performs storage of various kinds of data. For example, the storing unit 40 stores an uploaded content and a distribution condition for the content into content data 30 and distribution condition data 31, respectively. The acquisition unit 41 acquires client information from the client terminal 12 through the repeating server 14. The selection unit 42 reads out server information 32 of the repeating server 14 having the server ID added to the client information from the storage unit 22 and determines an adjacent relationship of a visit destination on a movement path from a user visit history of the read out server information 32. Then, the selection unit 42 selects a content or contents of a distribution target on the basis of the adjacent relationship of the visit destination on the movement path.

The distribution unit 43 distributes the content or contents selected by the selection unit 42 to the client terminal 12 on the basis of the distribution condition.

Figure 14:
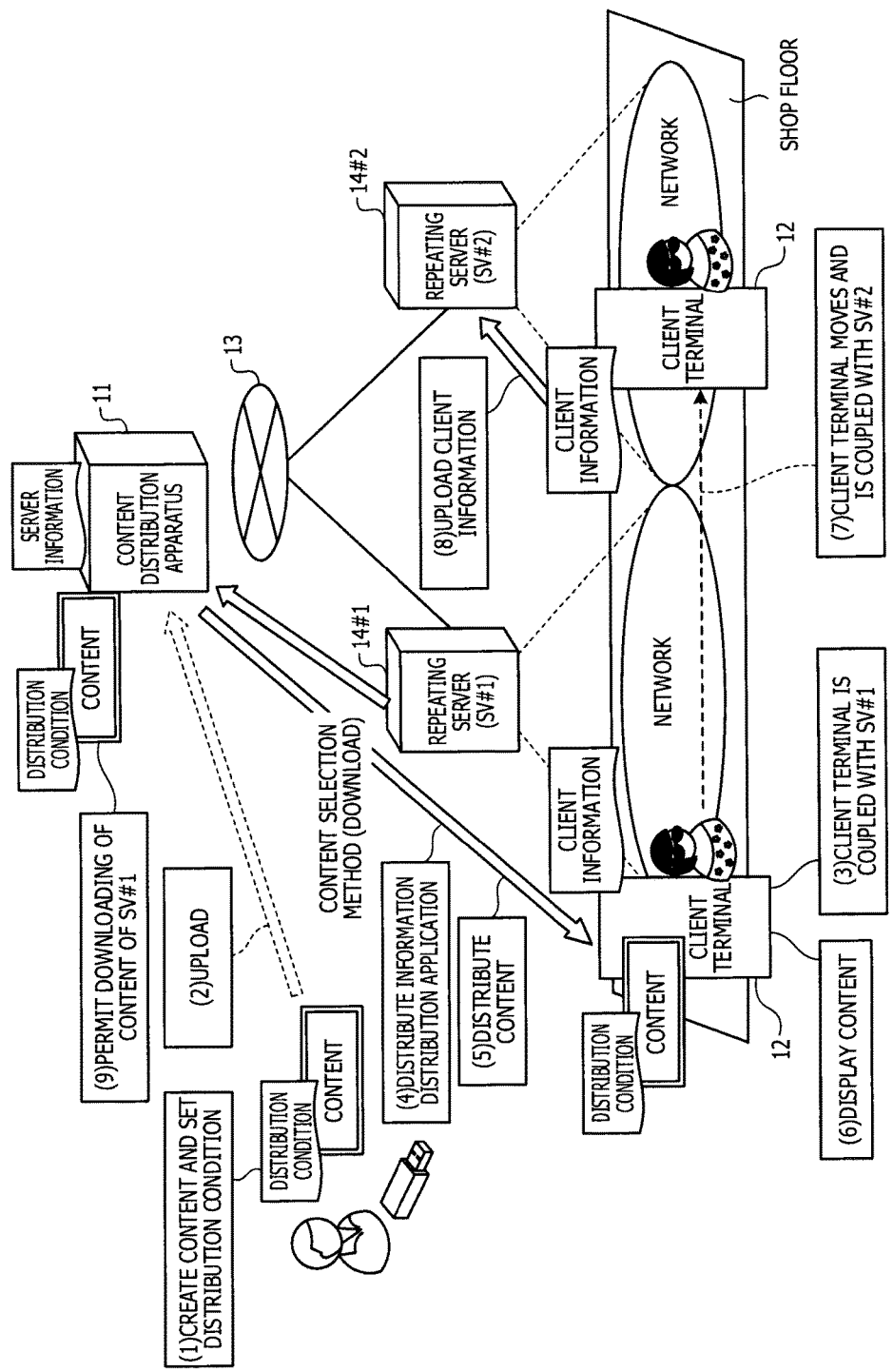
FIG. 14 depicts an example of a flow when a content distribution system according to the second embodiment distributes a content.

Now, a particular example is described. FIG. 14 depicts an example of a flow when a content distribution system according to the second embodiment distributes a content. In the following description, it is assumed that the server ID of the repeating server 14#1 is "Sv#1" and the server ID of the repeating server 14#2 is "Sv#2."

A requester who requests distribution of a content would create a content and set a distribution condition for the content (1). For example, the requester would create a content relating to a shop in which the repeating server 14#1 is disposed and set a distribution condition. Then, the requester would upload the created content and the distribution condition for the content to the content distribution apparatus 11 (2). In the example of FIG. 14, the content and the distribution condition are uploaded to the content distribution apparatus 11 using a USB memory. It is to be noted that the uploading (2) method is not limited to the method described above. For example, the content and the distribution condition may be uploaded to the content distribution apparatus 11 through a NAS, a cloud storage, a Web API or the like using an external storage such as, for example, an SD memory card or the wire communication I/F unit 20.

The client terminal 12 establishes a coupling with the repeating server 14#1 when the client terminal 12 enters the communication area of the repeating server 14#1 through movement of the user (3). If the content distribution apparatus 11 is notified of the coupling of the client terminal 12 for the first time through the repeating server 14#1, then the content distribution apparatus 11 distributes an application program for information distribution to the client terminal 12 (4). In the client terminal 12, the application program for information distribution is executed to create client information relating to the client terminal 12. Since the execution of the application program for information distribution has started only recently, only "Sv#1" is recorded as the user visit path in the client information. The client terminal 12 transmits the client information to the content distribution apparatus 11 through the repeating server 14#1. The content distribution apparatus 11 determines an adjacent relationship of the visit destination on the movement path from the user visit history in the server information 32 of the repeating server 14 having the server ID added to the client information. Then, the selection unit 42 selects a content or contents of a distribution target on the basis of the adjacent relationship of the visit destination on the movement path and distributes the selected content or contents and the distribution conditions for the contents to the client terminal 12 (5). Here, in the content distribution apparatus 11, information is not initially stored in the user visit path of the server information 32. In this case, the content distribution apparatus 11 selects a content or contents in accordance with a given rule or at random and distributes the content or contents to the client terminal 12. For example, the content distribution apparatus 11 distributes a content of the shop of the repeating server 14, by which the client information has been repeated, to the client terminal 12.

The client terminal 12 causes the content or contents distributed thereto to be displayed (6).

The client terminal 12 establishes a coupling with the repeating server 14#2 if the client terminal 12 enters the communication area of the repeating server 14#2 through movement of the user (7). The client terminal 12 uploads the client information to the content distribution apparatus 11 through the repeating server 14#2 (8). This client information has "Sv#1→Sv#2" stored therein as the user visit path. In the content distribution apparatus 11, the user visit history of the client information is stored into the user visit history of the server information 32 of the repeating server 14#2. In the example of FIG. 14, "Sv#1→Sv#2" is stored into the user visit path of the server information 32 of the repeating server 14#2. Consequently, in the shop in which the repeating server 14#2 is disposed, the content distribution apparatus 11 can thereafter distribute a content of the shop of the repeating server 14#1 (9). For example, if a user who has not visited the shop of the repeating server 14#1 visits the shop of the repeating server 14#2, then the content distribution apparatus 11 distributes a content of the shop of the repeating server 14#1. In this manner, also with the content distribution system 10 according to the second embodiment, the distribution range of a content can be controlled.

[Effect]

As described above, the content distribution apparatus 11 according to the present embodiment stores a content and a distribution condition for the content into the storage unit 22. The content distribution apparatus 11 acquires the client information 62 relating to the client terminal 12 from the client terminal 12 through the repeating server 14. The content distribution apparatus 11 selects a content or contents of a distribution target from the storage unit 22 on the basis of the acquired client information 62. The content distribution apparatus 11 distributes the selected content or contents to the client terminal 12 through the repeating server 14 on the basis of the distribution condition. Consequently, the content distribution apparatus 11 can control the distribution range of the contents even when distribution of contents is managed in a center through the repeating server 14.

Third Embodiment

Now, a third embodiment is described. It is to be noted that like elements to the elements in the first and second embodiments are denoted by like reference symbols and the following description is given principally of differences.

[Configuration of System]

Figure 15:
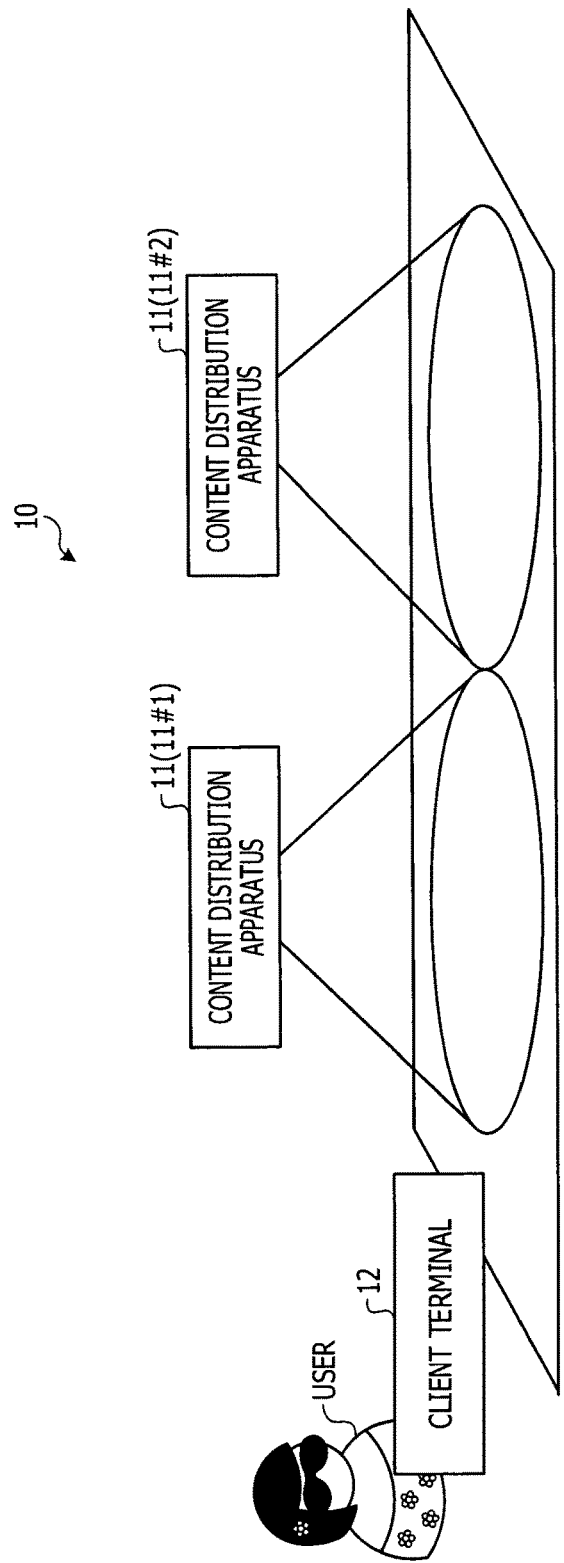
FIG. 15 depicts an example of a general configuration of an entire content distribution system according to a third embodiment.

FIG. 15 depicts an example of a general configuration of an entire content distribution system according to the third embodiment. Referring to FIG. 15, a content distribution system 10 according to the third embodiment includes a plurality of content distribution apparatuses 11 and a client terminal 12. The plurality of content distribution apparatuses 11 individually have a standalone configuration and may not exchange information therebetween through a network. A content to be distributed is uploaded to one of the content distribution apparatuses 11.

Each content distribution apparatus 11 has a communication area formed therearound, within which distribution of a content is possible. In the example of FIG. 15, each of the communication areas of the content distribution apparatuses 11 is indicated by an ellipse.

The content distribution apparatus 11 to which a content has been uploaded distributes the content to the client terminal 12 in the communication area of the content distribution apparatus 11. The client terminal 12 to which the content has been distributed uploads the content if the client terminal 12 enters the communication area of a different one of the content distribution apparatuses 11. In this manner, in the content distribution system 10 according to the third embodiment, a content is distributed to each of the content distribution apparatuses 11 by the client terminal 12.

[Configuration of Content Distribution Apparatus]

Figure 16:
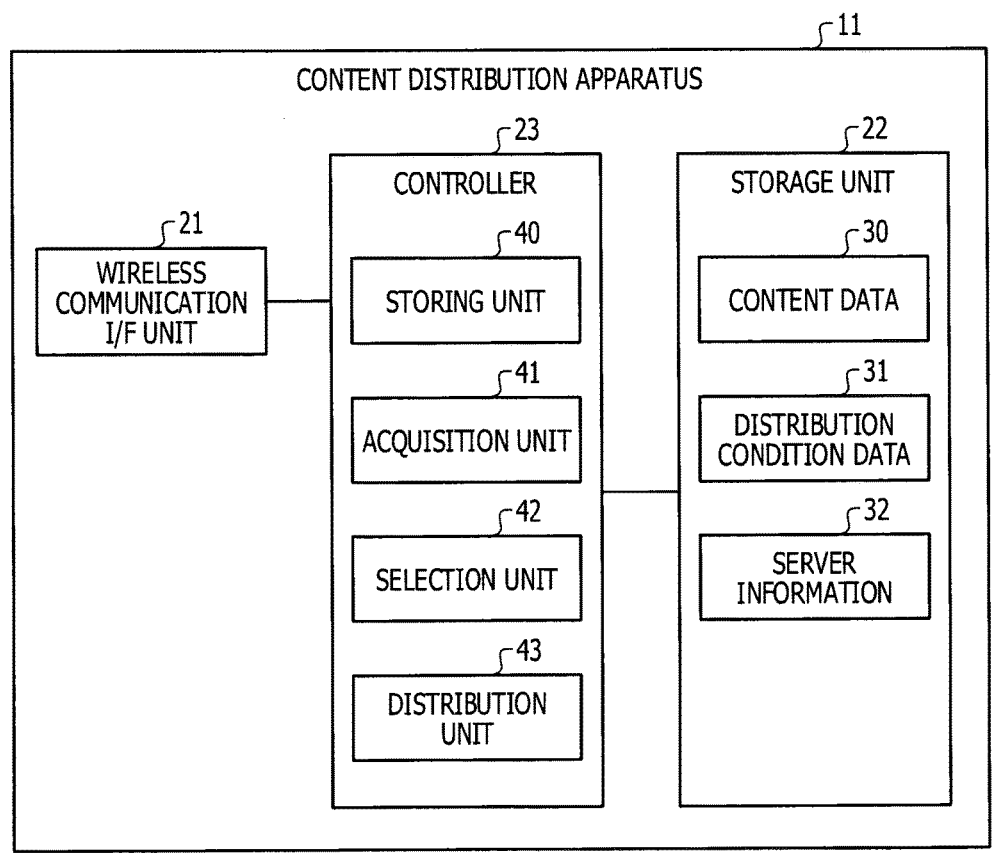
FIG. 16 depicts an example of a general configuration of a content distribution apparatus according to the third embodiment.

Now, a configuration of a content distribution apparatus according to the third embodiment is described. FIG. 16 depicts an example of a general configuration of a content distribution apparatus according to the third embodiment. The content distribution apparatus depicted in FIG. 16 may be the content distributed apparatus 11 depicted in FIG. 15. As depicted in FIG. 16, the content distribution apparatus 11 according to the embodiment is same as the content distribution apparatus 11 according to the first embodiment depicted in FIG. 2 except that the wire communication I/F unit 20 is removed.

The wireless communication I/F unit 21 performs transfer of data of client information or a content to and from the client terminal 12. For example, the wireless communication I/F unit 21 transmits a content and a distribution condition for the content to the client terminal 12. Further, the wireless communication I/F unit 21 receives a content and a distribution condition for the content from the client terminal 12.

The storing unit 40 stores contents and distribution conditions of the contents uploaded thereto into content data 30 and distribution condition data 31, respectively.

Figure 17:
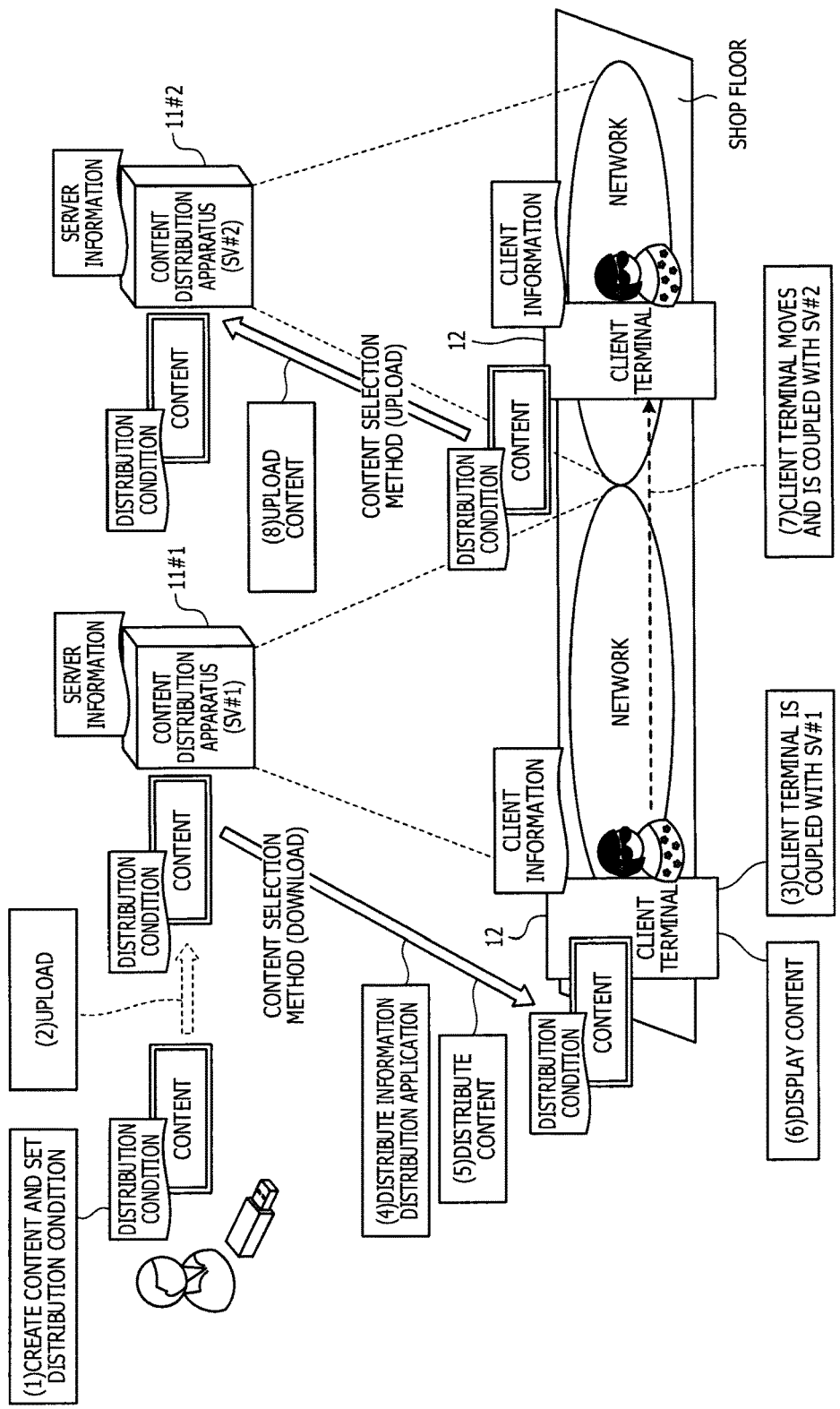
FIG. 17 depicts an example of a flow when a content distribution system according to the third embodiment distributes a content.

Now, a particular example is described. FIG. 17 depicts an example of a flow when a content distribution system according to the third embodiment distributes a content. In the following description, it is assumed that the server ID of the content distribution apparatus 11#1 is "Sv#1" and the server ID of the content distribution apparatus 11#2 is "Sv#2."

A requester who requests distribution of a content would create a content and set a distribution condition for the content (1). For example, the requester would create a content relating to a shop in which the content distribution apparatus 11#1 is disposed and set a distribution condition. Then, the requester would upload the created content and the distribution condition for the content to the content distribution apparatus 11 (2). In the example of FIG. 17, the content and the distribution condition are uploaded to the content distribution apparatus 11#1 using a USB memory. It is to be noted that the uploading (2) method is not limited to the method described above. For example, the content and the distribution condition may be uploaded to the content distribution apparatus 11#1 through a NAS, a cloud storage, a Web API or the like using an external storage such as, for example, an SD memory card or the wireless communication I/F unit 21.

The client terminal 12 establishes a coupling with the content distribution apparatus 11#1 if the client terminal 12 enters the communication area of the content distribution apparatus 11#1 through movement of the user (3). The content distribution apparatus 11#1 distributes an application program for information distribution to the client terminal 12 (4). In the client terminal 12, the application program for information distribution is executed to create client information relating to the client terminal 12. Since execution of the application program for information distribution has started only recently, only "Sv#1" is recorded as the user visit path in the client information. The client terminal 12 transmits the client information to the content distribution apparatus 11#1. The content distribution apparatus 11#1 distributes the content and the distribution condition for the content to the client terminal 12 (5). Here, in the content distribution apparatuses 11#1 and 11#2, information is not initially stored in the user visit path of the server information 32. In this case, the content distribution apparatuses 11#1 and 11#2 select a content in accordance with a given rule or at random and distribute the content to the client terminal 12. For example, the content distribution apparatus 11#1 distributes a content of itself to the client terminal 12.

The client terminal 12 causes the content distributed thereto to be displayed (6).

The client terminal 12 establishes a coupling with the content distribution apparatus 11#2 if the client terminal 12 enters the communication area of the content distribution apparatus 11#2 through movement of the user (7). The client terminal 12 uploads the content and the distribution condition for the content stored therein to the content distribution apparatus 11#2 (8). Consequently, the content distribution apparatus 11#2 can acquire the content and the distribution condition for the content and thereafter distribute the acquired content. It is to be noted that the client terminal 12 may select and upload only a content or contents that satisfy the distribution condition. For example, the client terminal 12 may determine whether the current content generation is within the re-distributable generation or whether it is within the content validity period such that the client terminal 12 selects and uploads only a content or contents that satisfy the distribution condition. Further, the client terminal 12 may acquire server information from the content distribution apparatus 11#2 and select and upload only a content or contents whose shop type coincides with a distribution desired type. Alternatively, the client terminal 12 may upload contents and distribution conditions of the contents stored therein to the content distribution apparatus 11#2 such that the content distribution apparatus 11#2 selects and stores only a content or contents that satisfy the distribution conditions.

[Flow of Processing]

Figure 18:
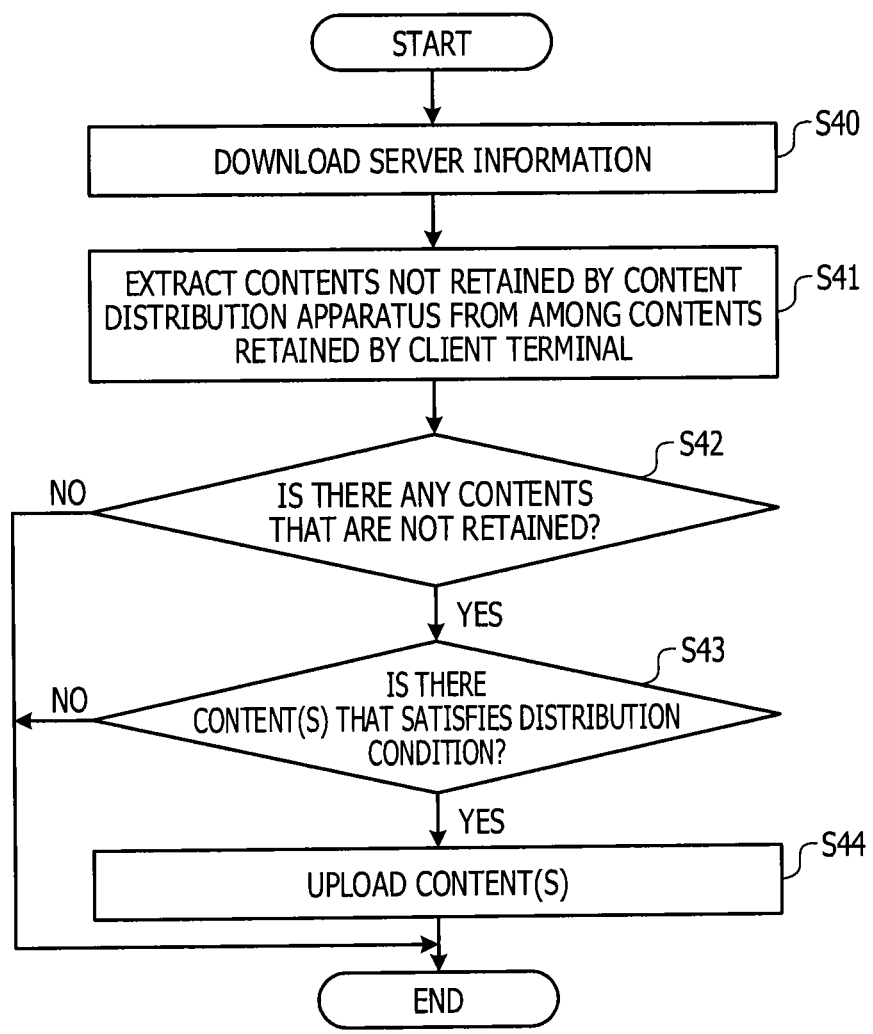
FIG. 18 is a flow chart illustrating an example of a procedure of an uploading process.

Now, a flow of an uploading process when a client terminal uploads a content to a content distribution apparatus is described. FIG. 18 is a flow chart illustrating an example of a procedure of an uploading process. The client terminal and the content distribution apparatus described with reference to FIG. 18 may be the client terminal 12 and the content distribution apparatus 11, respectively, depicted in FIG. 15. This uploading process is executed at a given timing, for example, at a timing at which the client terminal 12 enters the communication area of the content distribution apparatus 11 and establishes a coupling with the content distribution apparatus 11.

Referring to FIG. 18, the upload controlling unit 70 acquires server information 32 from the content distribution apparatus 11 (S40). The upload controlling unit 70 extracts those contents that are retained by the client terminal 12 but not retained by the content distribution apparatus 11 on the basis of the server information 32 (S41).

The upload controlling unit 70 decides whether or not there remain some contents that are not retained by the content distribution apparatus 11 as a result of the extraction (S42). If a content that is not retained by the content distribution apparatus 11 does not remain (No at step S42), then the processing is ended.

If a content or contents that are not retained by the content distribution apparatus 11 remain (Yes at step S42), then the upload controlling unit 70 decides whether or not a content or contents satisfy the distribution condition (S43). If no content satisfies the distribution condition (No at step S43), then the processing is ended.

If a content or contents satisfy the distribution condition (Yes at step S43), on the other hand, the upload controlling unit 70 uploads the content or contents that satisfy the distribution condition to the content distribution apparatus 11 together with the distribution condition for the contents (S44). Then, the processing is ended.

[Effect]

As described above, in the content distribution system 10 according to the present embodiment, the content distribution apparatus 11#1 distributes a content or contents with which a distribution condition is associated to the client terminal 12. The client terminal 12 determines whether the client terminal 12 is communicatable with the content distribution apparatus 11#2. If the client terminal 12 is communicable with the content distribution apparatus 11#2, then the client terminal 12 uploads the information for specifying the content or contents received from the content distribution apparatus 11#1 to the content distribution apparatus 11#2. The content distribution apparatus 11#2 enables distribution of the content or contents specified by the information received from the client terminal 12 on the basis of the distribution condition. Consequently, in the content distribution system 10, the distribution range of the contents can be controlled.

Fourth Embodiment

Now, a fourth embodiment is described. It is to be noted that like elements to the elements in the first to third embodiments are denoted by like reference symbols and the following description is given principally of differences. Since the configuration of the content distribution system 10 is similar to the configuration of the content distribution system 10 in the first to third embodiments, description thereof is omitted. In the present embodiment, a case in which the present technology is applied to the content distribution apparatus 11 of the content distribution system 10 of the first embodiment is described as an example.

Incidentally, even if a user views a content distributed to the client terminal 12, where the shop corresponding to the content is located remotely, there is a tendency that the probability that the shop is visited is lower than the probability in an alternative case in which the shop is located near since it is troublesome for the user to move. Where the reward for distribution of an advertisement is determined in accordance with the degree of contribution to the revenue such as the amount of money generated by purchase through visiting on shops by users, the probability that a user may visit a remote shop is low. Therefore, there is a tendency that also the reward obtained from an advertisement in the remote shop becomes low. Consequently, if the distribution side of an advertisement intends to obtain much reward, then the content distribution apparatus 11 is controlled so that advertisement of near shops may be distributed much.

On the other hand, since customers are likely to come from adjacent shops, an advertising sponsor does not want to pay much reward to advertisements presented in adjacent shops, but since customers are less likely to go to remote shops, there is such a need that the advertising sponsor wants to advertise positively.

Therefore, the content distribution apparatus 11 according to the present embodiment changes attribute information of a special favor provided to a content or the reward in response to the distance to a visit designation corresponding to the content.

[Configuration of Content Distribution Apparatus]

Figure 19:
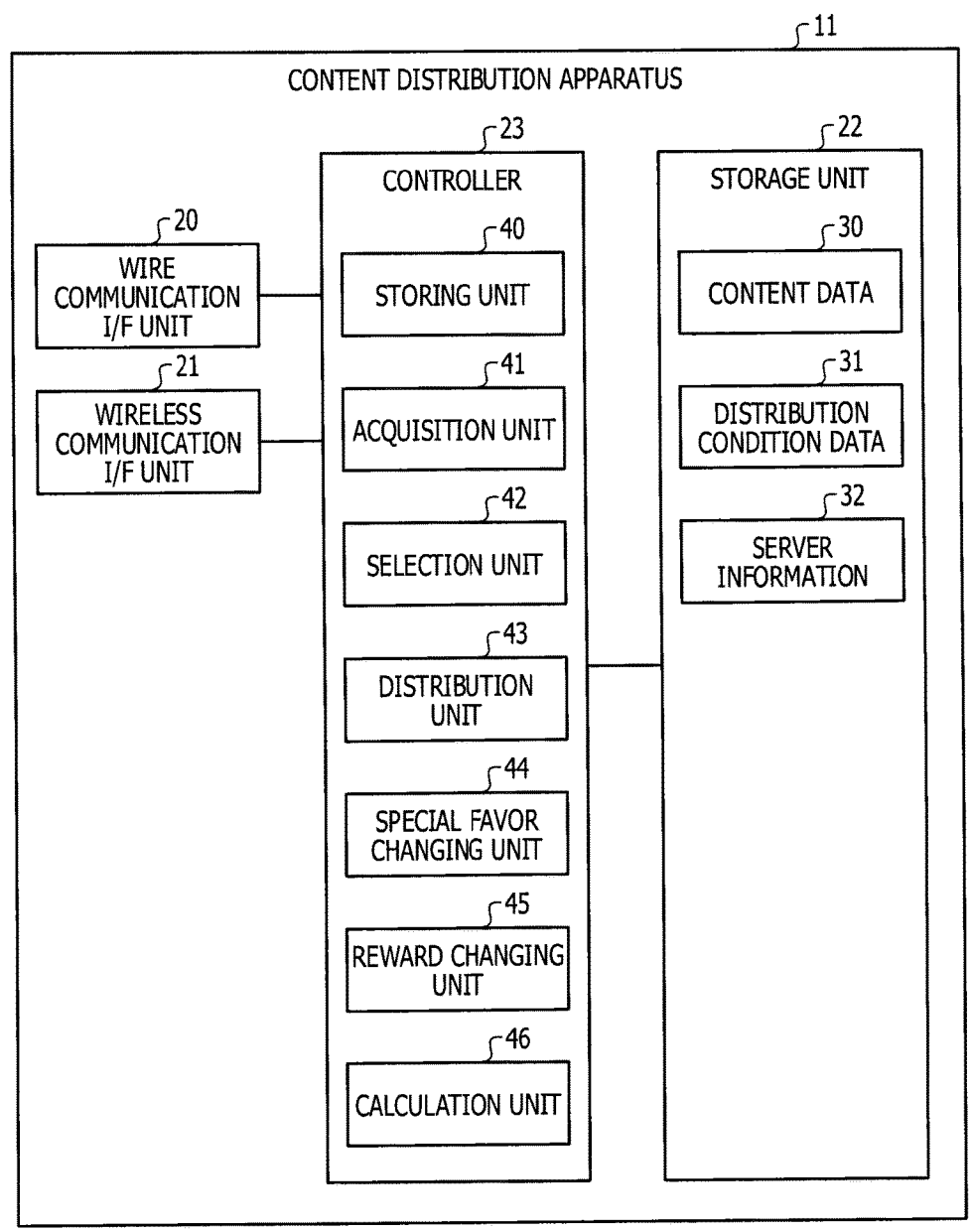
FIG. 19 depicts an example of a general configuration of a content distribution apparatus according to a fourth embodiment.

A configuration of a content distribution apparatus according to the fourth embodiment is described. FIG. 19 depicts an example of a general configuration of a content distribution apparatus according to the fourth embodiment. Referring to FIG. 19, a content distribution apparatus 11 according to the fourth embodiment is different from the content distribution apparatus 11 according to the first embodiment depicted in FIG. 2 in that the controller 23 further includes a special favor changing unit 44, a reward changing unit 45 and a calculation unit 46.

The special favor changing unit 44 changes the degree of the special favor (attribute information of the special favor) provided depending upon the content. For example, the special favor changing unit 44 increases the degree of the special favor provided depending upon the content as the distance to the visit destination corresponding to the content selected by the selection unit 42 increases. The distance to the visit destination may be determined from an adjacent relationship of the visit destination on the movement path of the user. For example, the special favor changing unit 44 may determine an average number of stopover points on the way to the visit destination from the user visit history in the server information 32 and, considering the number of stopover points as a pseudo distance, set a higher degree of the special favor provided depending upon the content as the number of stopover points increases. Alternatively, the special favor changing unit 44 may determine the ratio of users who have visited the visit destination corresponding to the content from the user visit history in the server information 32 and, considering the ratio as a pseudo distance, set a higher degree of the special favor provided depending upon the content as the ratio becomes lower. Alternatively, the distance to the visit destination may be an actual distance from the position of the current shop to the visit destination. The degree of the change of the special favor may be a stepwise change for each given distance or may be a linear change corresponding to the distance to the visit destination.

The reward changing unit 45 changes the degree of the reward to a content. For example, the reward changing unit 45 sets a higher degree of the reward when the content selected by the selection unit 42 contributes to the revenue as the distance to the visit destination corresponding to the content increases. The distance to the visit destination may be determined from an adjacent relationship of the visit destination on the movement path of the user. Also the degree of the change of the reward may be a stepwise change for each given distance or may be a linear change corresponding to the distance to the visit destination.

The calculation unit 46 performs various calculations. For example, the calculation unit 46 calculates an expected value of the reward obtained by distribution of a content. For example, the calculation unit 46 determines the ratio of users who have visited the visit destination corresponding to the content from the user visit history in the server information 32. Then, the calculation unit 46 multiplies the reward of the content by the ratio of users who have visited the visit destination corresponding to the content to calculate the expected value of the reward.

The distribution unit 43 distributes a content whose degree of the special favor has been changed taking the expected value of the reward depending upon the content into account. For example, the distribution unit 43 distributes, from among contents that satisfy the distribution condition, the content having the highest expected value of the reward. Alternatively, for example, the distribution unit 43 distributes, from among contents that satisfy the distribution condition, a given number of contents in the descending order of the expected value of the reward.

Figure 20:
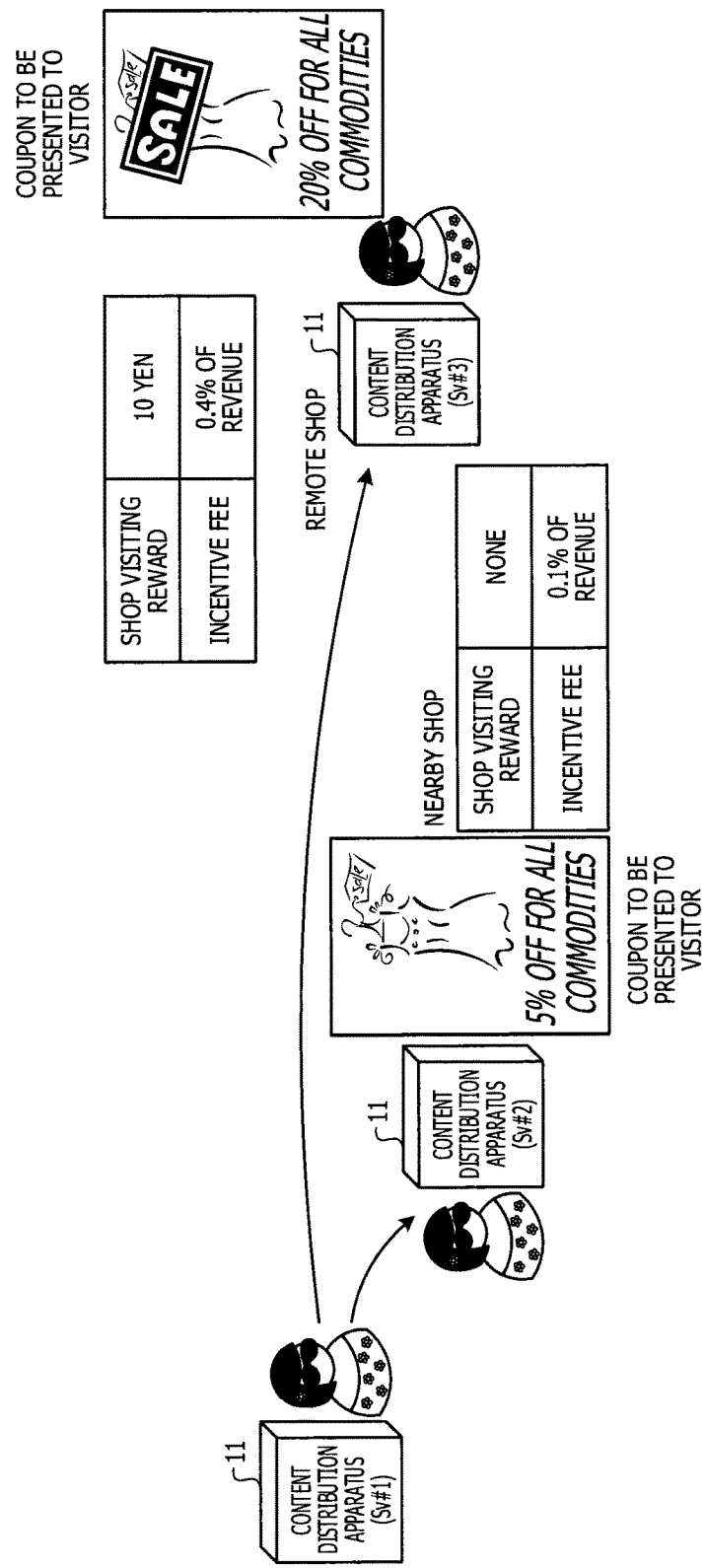
FIG. 20 depicts an example of a content to be distributed.

FIG. 20 depicts an example of a content to be distributed. In the example of FIG. 20, a coupon of a nearby shop indicates a discount rate of 5%. Meanwhile, a coupon of a remote shop indicates a discount rate of 20%. By setting the coupon of a remote shop to have a higher discount rate in this manner so as to provide a higher degree of the special favor, the probability that a user may visit the remote shop can be raised.

In the example of FIG. 20, the coupon of the nearby shop is determined such that the reward for visiting the shop is zero and the incentive fee is 0.1% of the revenue. Meanwhile, the coupon of the remote shop is determined such that the reward for visiting the shop is ten yen and the incentive fee is 0.4% of the revenue. By setting a higher reward to the coupon of the remote shop in this manner, the expected value of the reward becomes higher, and therefore, the opportunity that an advertisement of a remote shop is distributed can be increased.

It is to be noted that, while the present embodiment described above is directed to a case in which the present technology is applied to the content distribution apparatus 11 of the content distribution system 10 of the first embodiment, the present technology may be applied otherwise to the content distribution apparatus 11 of the content distribution system 10 of the second or third embodiment. For example, the content distribution apparatus 11 in the second or third embodiment may change the special favor provided to a content or the reward in response to the distance to the visit destination corresponding to the content.

[Effects]

As described above, the content distribution apparatus 11 according to the present embodiment sets a higher degree of the special favor provided depending upon the selected content as the distance to the visit destination corresponding to the content increases. The content distribution apparatus 11 distributes a content whose degree of the special favor has been increased. Consequently, the content distribution apparatus 11 can raise the probability that a user may visit a remote shop.

Further, the content distribution apparatus 11 according to the present embodiment sets a higher degree of the reward when the selected content contributes to the revenue as the distance to the visit destination corresponding to the content increases. The content distribution apparatus 11 calculates the expected value of the reward obtained by distribution of the content. The content distribution apparatus 11 distributes the content taking the expected value of the reward into account. Consequently, the content distribution apparatus 11 can increase the opportunity in which an advertisement of a remote shop is distributed.

Fifth Embodiment

Although embodiments relating to the disclosed apparatus have been described, the disclosed technology may be carried out in various forms in addition to the embodiments described above. Therefore, in the following, other embodiments which may be included in the present technology are described.

For example, in the selection process depicted in FIG. 11 of the first embodiment described hereinabove, a case in which a content of an own shop is selected preferentially is described. However, the selection process of the disclosed apparatus is not limited to the process depicted in FIG. 11. The selection process may be changed suitably in terms of the substance thereof in accordance with a condition applied preferentially. For example, a content with regard to which a content to be updated is set to the content update target in the distribution condition may be selected preferentially. Alternatively, a content with regard to which the distribution desired type in the distribution condition coincides with the shop type in the server information 32 of the content distribution apparatus 11 may be selected preferentially. Alternatively, a plurality of contents may be selected.

Figure 21:
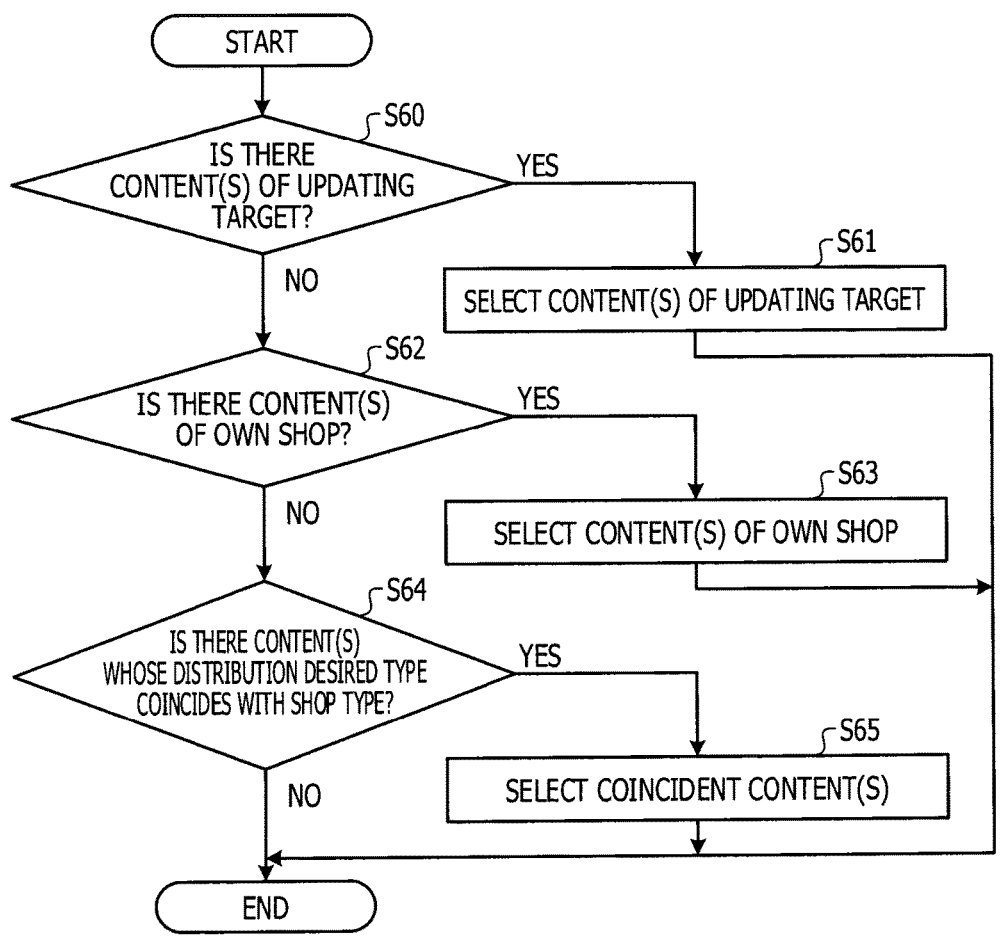
FIG. 21 is a flow chart illustrating another example of a procedure of the selection process.

FIG. 21 is a flow chart illustrating another example of a procedure of the selection process. Referring to FIG. 21, the selection unit 42 decides whether or not there is a content or contents of an updating target with regard to which a content to be updated is set to the content update target in the distribution condition (S60). If there is a content or contents of an updating target (Yes at step S60), then the selection unit 42 selects the content or contents of the updating target (S61), and then the processing is ended.

If there is no content of the updating target (No at step S60), then the selection unit 42 decides whether or not there is a content or contents of an own shop (S62). If there is a content or contents of the own shop (Yes at step S62), then the selection unit 42 selects the content or contents of the own shop (S63). Then, the processing is ended.

If there is no content of the own shop (No at step S62), on the other hand, the selection unit 42 decides whether or not there is a content or contents with regard to which the distribution desired type in the distribution condition for the content coincides with the shop type in the server information 32 of the content distribution apparatus 11 (S64). If there is a content or contents that coincide in type (Yes at step S64), then the selection unit 42 selects the content or contents that coincide in type (S65), and then the processing is ended. If there is no content that coincides in type (No at step S64), on the other hand, the processing is ended.

Figure 22:
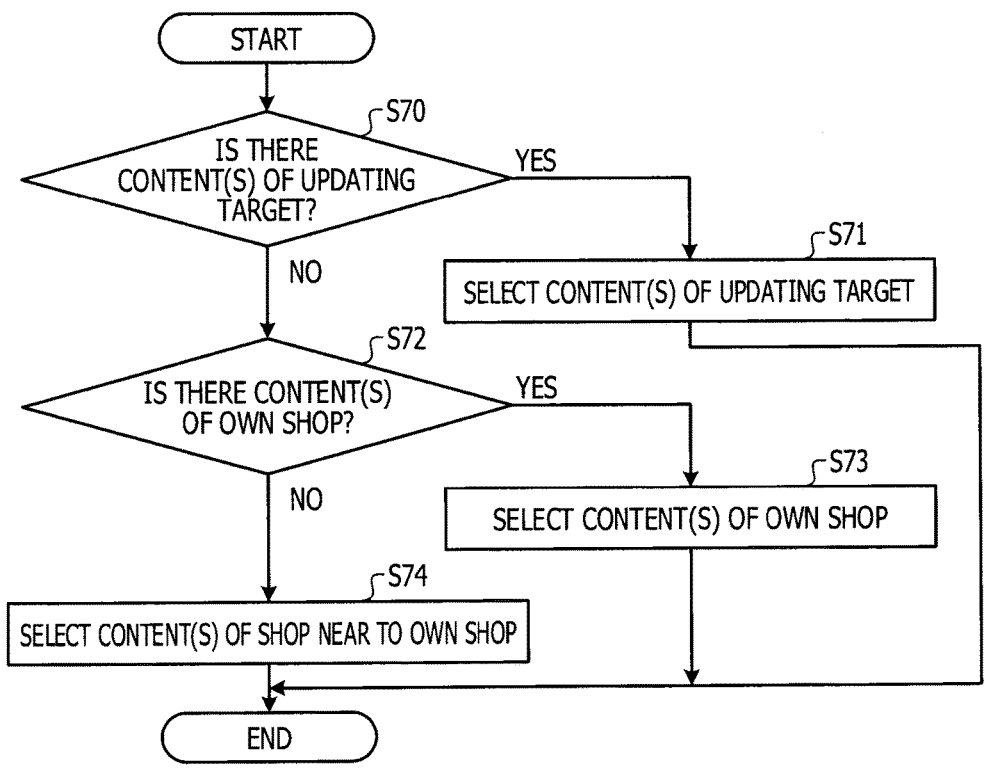
FIG. 22 is a flow chart illustrating a further example of a procedure of the selection process.

FIG. 22 is a flow chart illustrating a further example of a procedure of the selection process. Referring to FIG. 22, the selection unit 42 decides whether or not there is a content or contents of an updating target with regard to which a content to be updated is set to the content update target in the distribution condition (S70). If there is a content or contents of an updating target (Yes at step S70), then the selection unit 42 selects the content or contents of the updating target (S71), and then the processing is ended.

If there is no content of the updating target (No at step S70), then the selection unit 42 decides whether or not there is a content or contents of the own shop (S72). If there is a content or contents of the own shop (Yes at step S72), then the selection unit 42 selects the content or contents of the own shop (S73), and then the processing is ended.

If there is no content of the own shop (No at step S72), on the other hand, the selection unit 42 selects a content or contents of a shop nearest to the own shop on the movement path (S74), and then the processing is ended.

Figure 23:
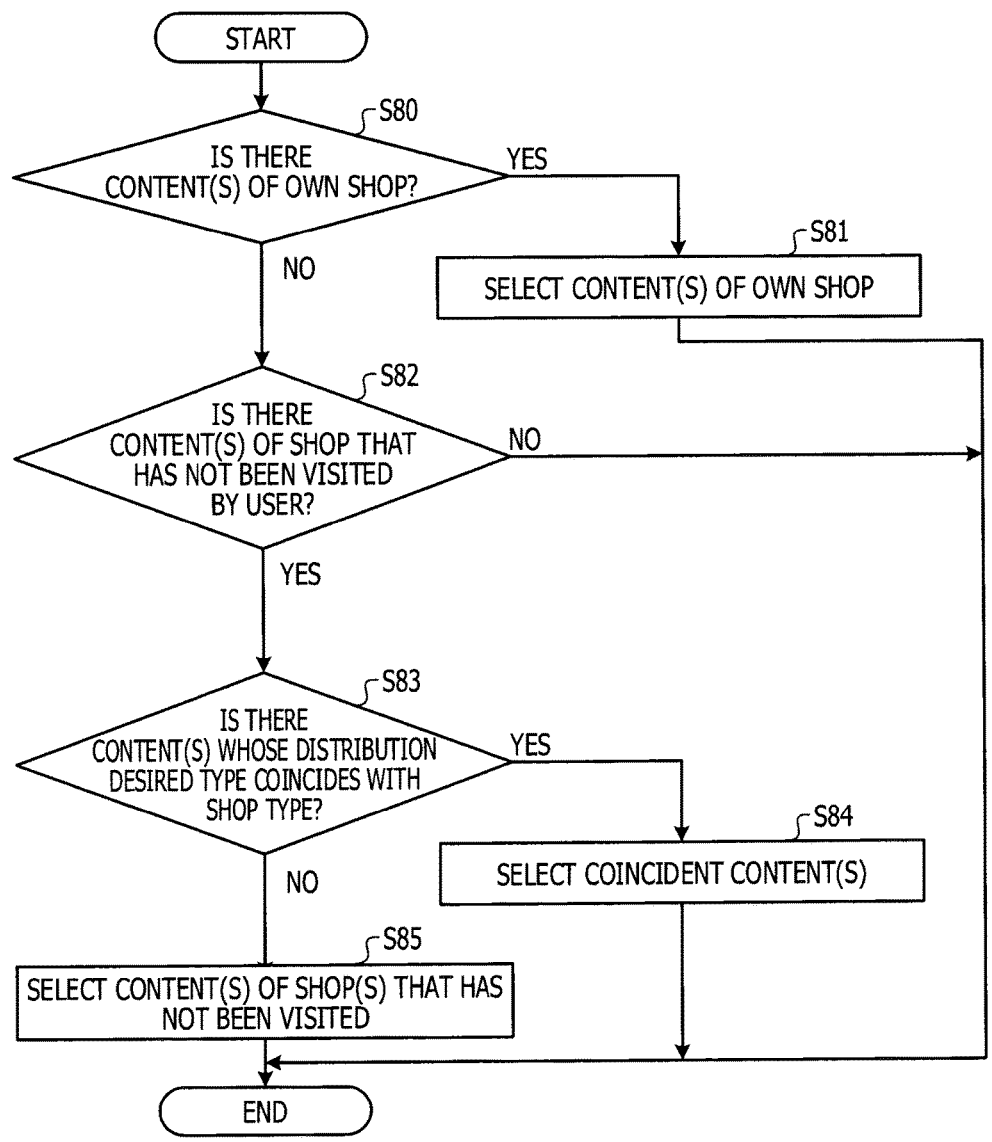
FIG. 23 is a flow chart illustrating a still further example of a procedure of the selection process.

FIG. 23 is a flow chart illustrating a further example of a procedure of the selection process. Referring to FIG. 23, the selection unit 42 decides whether or not there is a content or contents of the own shop (S80). If there is a content or contents of the own shop (Yes at step S80), then the selection unit 42 selects the content or contents of the own shop (S81), and then the processing is ended.

If there is no content of the own shop (No at step S80), then the selection unit 42 decides whether or not there is a content or contents of a shop that has not been visited by the user (S82). If there is no content of a shop that has not been visited by the user (No at step S82), then the processing is ended.

If there is a content or contents of a shop that has not been visited by the user (Yes at step S82), then the selection unit 42 decides whether or not there is a content or contents with regard to which the distribution desired type in the distribution condition coincides with the shop type in the server information 32 of the content distribution apparatus 11 in the content or contents of the shop or shops that have not been visited by the user (S83). If there is a content or contents that coincide in type (Yes at step S83), then the selection unit 42 selects a content or contents that coincides in type (S84), and then the processing is ended. If there is no content that coincides in type (No at step S83), on the other hand, the selection unit 42 selects a content or contents of the shop or shops that have not been visited by the user (S85), and then the processing is ended.

Further, the components of the apparatuses depicted in the figures are functionally conceptual and may not necessarily be physically configured as depicted in the figures. In particular, particular states of disintegration or integration of the individual apparatuses are not limited to the states depicted in the figures, but all or some of the apparatuses may be functionally or physically disintegrated or integrated in an arbitrary unit in response to various types of loads or situations in use. For example, the processing units such as the storing unit 40, acquisition unit 41, selection unit 42, distribution unit 43, special favor changing unit 44, reward changing unit 45 and calculation unit 46 of the controller 23 of the content distribution apparatus 11 may be integrated suitably. Further, the processing units such as the upload controlling unit 70, storing unit 71, displaying controlling unit 72 and deletion unit 73 of the controller 54 of the client terminal 12 may be integrated suitably. Further, a process of each processing unit may be suitably disintegrated into processes of a plurality of processing units. Further, all or arbitrary ones of the processing functions performed by the processing units may be implemented by a CPU and a program analyzed and executed by the CPU or may be implemented as hardware by wired logics.

[Content Distribution Controlling Program]

Figure 24:
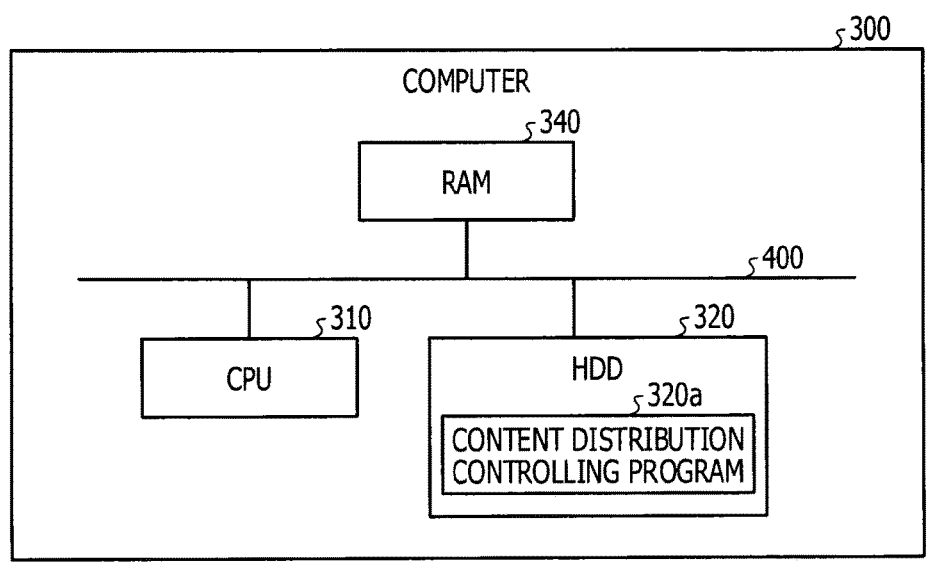
FIG. 24 depicts a computer that executes a content distribution controlling program.

The various processes described above in connection with the embodiments may be implemented by execution of a program prepared in advance by a computer system such as a personal computer or a work station. In the following description, an example of the computer system that executes a program having functions similar to the functions in the embodiments described hereinabove is described. FIG. 24 depicts a computer that executes a content distribution controlling program.

As depicted in FIG. 24, a computer 300 includes a CPU 310, a hard disk drive (HDD) 320 and a RAM 340. The CPU 310, the HDD 320 and the RAM 340 are coupled to each other via a bus 400.

In the HDD 320, a content distribution controlling program 320a that exhibits functions similar to the functions of the storing unit 40, acquisition unit 41, selection unit 42, distribution unit 43, special favor changing unit 44, reward changing unit 45 and calculation unit 46 described above is stored in advance. The content distribution controlling program 320a may be separated suitably.

The HDD 320 stores various kinds of information therein. For example, the HDD 320 stores an OS and various kinds of data used in production planning.

The CPU 310 reads out the content distribution controlling program 320a from the HDD 320 and executes the content distribution controlling program 320a, thereby executing operations similar to the operations of the processing units in the embodiments. In other words, the content distribution controlling program 320a executes operations similar to the operations of the storing unit 40, acquisition unit 41, selection unit 42, distribution unit 43, special favor changing unit 44, reward changing unit 45 and calculation unit 46.

It is to be noted that the content distribution controlling program 320a described above may not necessarily be stored in the HDD 320 from the beginning.

For example, the program is stored into and retained in a "portable physical medium" inserted in the computer 300, such as a flexible disk (FD), a compact disk read only memory (CD-ROM), a digital versatile disk (DVD), a magneto-optical disk or an integrated circuit (IC) card. The computer 300 may read out the program from the portable physical medium and execute the program.

Furthermore, the program may be stored into a "different computer (or server)" or the like coupled to the computer 300 through a public network, the Internet, a LAN, a wide area network (WAN) or the like. Then, the computer 300 may read out the program from the different computer or server and execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A system, comprising:
   a memory configured to store a plurality of pieces of content and a plurality of distribution conditions corresponding to each of the plurality of pieces of content; and
   circuitry configured to
      acquire condition information from a mobile terminal, the condition information including first path information and identification information, the first path information identifying a movement path of the mobile terminal, the identification information identifying each piece of the plurality of pieces of content stored by the mobile terminal;
      compare the first path information of the condition information acquired from the mobile terminal to each of the plurality of distribution conditions stored in the memory;
      identify, based on the comparing and the identification information of the condition information acquired from the mobile terminal, one or more pieces of content of the plurality of pieces of content that is not stored by the mobile terminal and having a distribution condition matching the condition information acquired from the mobile terminal; and
      distribute, to the mobile terminal, the identified one or more pieces of content and distribution conditions, of the plurality of distribution conditions, that correspond to the identified one or more pieces of content, wherein
   a distribution condition indicates at least one of a validity period of a piece of content, a distribution target of at least one of the piece of content among the plurality of pieces of content and a distribution range to which the piece of content is to be distributed, and
   the circuitry is configured to identify the one or more pieces of content to be distributed to the mobile terminal based on the distribution condition.

2. The system according to claim 1, wherein
   the plurality of distribution conditions include second path information identifying a movement path of a mobile terminal to which each of the one or more pieces of content are to be distributed, and
   the circuitry is configured to identify the one or more pieces of content to be distributed to the mobile terminal based on a comparison between the first path information and the second path information.

3. The system according to claim 1, wherein the circuitry is configured to identify, based on the condition information, at least one piece of content of the plurality of pieces of content stored in the memory that is not stored at the mobile terminal as the one or more pieces of content to be distributed to the mobile terminal.

4. The system according to claim 1, wherein
   the memory stores attribute information corresponding to each of the plurality of pieces of content stored in the memory, and
   the circuitry is configured to identify the one or more pieces of content to be distributed to the mobile terminal based on the plurality of distribution conditions and the attribute information.

5. The system according to claim 4, wherein the circuitry is configured to
   change a degree of the attribute information of at least one of the plurality of pieces of content based on a distance between the system and a location of the mobile terminal based on the movement path stored in the memory, and
   distribute the at least one of the pieces of content having the changed degree of the attribute information.

6. The system according to claim 1, further comprising:
   a first content distribution apparatus including the circuitry;
   a second content distribution apparatus; and
   the mobile terminal, wherein
   the first content distribution apparatus is configured to distribute, to the mobile terminal, the identified one or more pieces of content and the distribution conditions,
   the mobile terminal is configured to
      determine whether communication with the second content distribution apparatus is established; and
      upload at least the identification information corresponding to the pieces of content stored by the mobile terminal and the plurality of distribution conditions to the second content distribution apparatus in a case that communication with the second content distribution apparatus is established, and
   the second content distribution apparatus is configured to distribute the pieces of content stored by the mobile terminal to another mobile terminal in accordance with the distribution conditions corresponding to the one or more pieces of content.

7. The system according to claim 6, wherein the second content distribution apparatus is configured to
   determine whether the pieces of content are stored in the second content distribution apparatus based on the second identification information received from the mobile terminal; and
   transmit an instruction to the mobile terminal to upload the pieces of content to the second content distribution apparatus.

8. The system according to claim 7, wherein the mobile terminal is configured to upload the pieces of content to the second content distribution apparatus when the mobile terminal receives the instruction from the second content distribution apparatus.

9. The system according to claim 6, wherein the second content distribution apparatus is configured to
  store another piece of content;
  determine whether the another piece of content is stored in the mobile terminal based on the identification information received from the mobile terminal; and
  distribute the another piece of content to the mobile terminal when the another piece of content is not stored in the mobile terminal.

10. A non-transitory computer readable medium including a computer program, which when executed by a mobile terminal, cause the mobile terminal to:
  receive a piece of content and a distribution condition associated with the piece of content from a first content distribution apparatus, the first content distribution apparatus having identified the piece of content according to the distribution condition;
  transmit, to the first content distribution apparatus, condition information including first path information and identification information, the first path information identifying a movement path of the mobile terminal, the identification information identifying the piece of content stored by the mobile terminal;
  determine whether communication with a second content distribution apparatus is established; and
  upload the piece of content, the identification information and the associated distribution condition to the second content distribution apparatus in a case that communication with the second content distribution apparatus is established, wherein
  the second content distribution apparatus identifies, based on the identification information of the condition information, whether the piece of content is stored by another mobile terminal, and distributes the piece of content to the another mobile terminal in accordance with the associated distribution condition when the another mobile terminal does not store the piece of content,
  the distribution condition indicates at least one of a validity period of a piece of content, a distribution target of at least one of the piece of content among the plurality of pieces of content and a distribution range to which the piece of content is to be distributed, and
  the first content distribution apparatus identifies the one or more pieces of content to be distributed to the mobile terminal based on the distribution condition.

11. A content distribution method, comprising:
  storing, by a first content distribution apparatus, a plurality of pieces of content and a plurality of distribution conditions corresponding to each of the plurality of pieces of content;
  acquiring, by the first content distribution apparatus, condition information from a mobile terminal, the condition information including first path information and identification information, the first path information identifying a movement path of the mobile terminal, the identification information identifying each piece of the plurality of pieces of content stored by the mobile terminal;
  comparing, by the first content distribution apparatus, the first path information of the condition information acquired from the mobile terminal to each of the plurality of distribution conditions stored in the memory;
  identifying, by the first content distribution apparatus and based on the comparing and the identification information of the condition information acquired from the mobile terminal, one or more pieces of content of the plurality of pieces of content that is not stored by the mobile terminal and having a distribution condition matching the condition information acquired from the mobile terminal; and
  distributing, by the first content distribution apparatus to the mobile terminal, the identified one or more pieces of content and distribution conditions, of the plurality of distribution conditions, that correspond to the identified one or more pieces of content, wherein
  a distribution condition indicates at least one of a validity period of a piece of content, a distribution target of at least one of the piece of content among the plurality of pieces of content and a distribution range to which the piece of content is to be distributed, and
  the identifying the one or more pieces of content to be distributed to the mobile terminal is based on the distribution condition.

12. The content distribution method according to the claim 11, further comprising:
  distributing, from the first content distribution apparatus, a distribution condition associated with a first piece of content of the plurality of pieces of content to the mobile terminal;
  determining, by the mobile terminal, whether communication with a second content distribution apparatus is established;
  uploading, by the mobile terminal, the identification information for specifying the first piece of content to the second content distribution apparatus when the communication with the second content distribution apparatus is established; and
  enabling, by the second content distribution apparatus, distribution of the first piece of content specified by the identification information based on the associated distribution condition.

13. The content distribution method according to claim 12, further comprising:
  determining, by the second content distribution apparatus, whether the first piece of content is stored in the second content distribution apparatus based on the at least identification information received from the mobile terminal; and
  transmitting, by the second content distribution apparatus, an instruction to the mobile terminal to upload the first piece of content to the second content distribution apparatus.

14. The content distribution method according to claim 13, further comprising:
  uploading, by the mobile terminal, the first piece of content to the second content distribution apparatus when the mobile terminal receives the instruction from the second content distribution apparatus.

15. The content distribution method according to claim 12, further comprising:
  storing, by the second content distribution apparatus, a second piece of content;
  determining, by the second content distribution apparatus, whether the second piece of content is stored in the mobile terminal based on at least the identification information received from the mobile terminal; and
  distributing, by the second content distribution apparatus, the second piece of content to the mobile terminal when the second piece of content is not stored in the mobile terminal.

* * * * *